(12) United States Patent
Fang et al.

(10) Patent No.: US 12,108,444 B2
(45) Date of Patent: Oct. 1, 2024

(54) ADJUSTABLE MULTI-LINK CLEAR CHANNEL ASSESSMENT FOR WIRELESS COMMUNICATION NETWORKS

(71) Applicant: ZTE Corporation, Guangdong (CN)

(72) Inventors: Yonggang Fang, Guangdong (CN); Bo Sun, Guangdong (CN); Zhiqiang Han, Guangdong (CN); Nan Li, Guangdong (CN)

(73) Assignee: ZTE Corporation, Guangdong (CN)

( * ) Notice: Subject to any disclaimer, the term of this patent is extended or adjusted under 35 U.S.C. 154(b) by 416 days.

(21) Appl. No.: 17/647,569

(22) Filed: Jan. 10, 2022

(65) Prior Publication Data

US 2022/0132572 A1   Apr. 28, 2022

Related U.S. Application Data

(63) Continuation of application No. PCT/US2020/088757, filed on May 6, 2020.

(30) Foreign Application Priority Data

Jul. 10, 2019   (WO) ................ PCT/CN2019/095428
Mar. 12, 2020   (WO) ................ PCT/CN2019/078991

(51) Int. Cl.
*H04W 74/0808* (2024.01)
*H04W 72/542* (2023.01)

(52) U.S. Cl.
CPC ..... *H04W 74/0808* (2013.01); *H04W 72/542* (2023.01)

(58) Field of Classification Search
CPC ........... H04W 74/0808; H04W 72/542; H04W 16/22; H04W 24/02; H04W 52/0209;
(Continued)

(56) References Cited

U.S. PATENT DOCUMENTS

2011/0235513 A1   9/2011   Ali
2012/0120892 A1   5/2012   Freda et al.
(Continued)

FOREIGN PATENT DOCUMENTS

CN   103222311 A   7/2013
CN   106375045       2/2017
(Continued)

OTHER PUBLICATIONS

Co-Pending EP Application No. 20836839.9 Extended Search Report, dated Sep. 22, 2022 11 pages.
(Continued)

*Primary Examiner* — Ayaz R Sheikh
*Assistant Examiner* — Louis Samara
(74) *Attorney, Agent, or Firm* — Perkins Coie LLP

(57) ABSTRACT

The present document discloses methods, systems, and devices related to digital wireless communications, and more specifically, to techniques related to adjustable clear channel assessment for simultaneous transmission and reception constraint multi-link device. The method of the adjustable multi-link clear channel assessment includes adjustment of signal strength measurement algorithm or adjustment of energy detection threshold for the assessment when the multi-link network allocation vector is set for the transmission. A method for wireless communication includes identifying, by a wireless device, that a first wireless link and a second wireless link of the wireless device are in a detecting state at a first time. The method also includes modifying, by the wireless device, a multi-link channel
(Continued)

availability assessment procedure of a second wireless link based on detecting a transmission state of the first wireless link at the first time.

20 Claims, 11 Drawing Sheets

(58) Field of Classification Search
CPC ... H04L 1/1887; H04L 45/245; H04L 1/1685; H04L 69/14; H04L 5/0037; H04L 1/00
See application file for complete search history.

(56) References Cited

U.S. PATENT DOCUMENTS

| | | | |
|---|---|---|---|
| 2016/0212625 A1 | 7/2016 | Damnjanovic et al. | |
| 2016/0316470 A1 | 10/2016 | Wong et al. | |
| 2016/0316474 A1 | 10/2016 | Merlin et al. | |
| 2017/0006542 A1* | 1/2017 | Huang | H04W 52/0209 |
| 2017/0055290 A1 | 2/2017 | Lv et al. | |
| 2017/0064739 A1* | 3/2017 | Hedayat | H04L 5/0037 |
| 2018/0176954 A1 | 6/2018 | Singh et al. | |
| 2018/0206190 A1 | 7/2018 | Cherian et al. | |
| 2018/0206284 A1* | 7/2018 | Zhou | H04L 1/1887 |
| 2018/0376394 A1 | 12/2018 | Hahn et al. | |
| 2019/0082373 A1 | 3/2019 | Patil et al. | |
| 2019/0082463 A1* | 3/2019 | Patil | H04W 74/0808 |
| 2019/0116546 A1 | 4/2019 | Kang et al. | |
| 2019/0150214 A1 | 5/2019 | Zhou et al. | |
| 2019/0335454 A1 | 10/2019 | Huang et al. | |
| 2019/0364555 A1 | 11/2019 | Huang et al. | |
| 2020/0029324 A1 | 1/2020 | Nezou et al. | |
| 2020/0322889 A1 | 10/2020 | Chitrakar et al. | |
| 2021/0007168 A1 | 1/2021 | Asterjadhi et al. | |
| 2021/0227547 A1 | 7/2021 | Chitrakar et al. | |
| 2021/0243749 A1 | 8/2021 | Hoang et al. | |
| 2021/0345134 A1* | 11/2021 | Ottersten | H04W 16/22 |
| 2021/0360522 A1 | 11/2021 | Chitrakar et al. | |
| 2022/0086098 A1 | 3/2022 | Huang et al. | |
| 2023/0379999 A1* | 11/2023 | Kim | H04L 1/00 |

FOREIGN PATENT DOCUMENTS

| | | | |
|---|---|---|---|
| CN | 107548569 A | 1/2018 | |
| CN | 104349405 B | 1/2019 | |
| CN | 107852299 | 11/2020 | |
| CN | 112188640 A * | 1/2021 | H04L 69/14 |
| JP | 09289684 A | 4/1997 | |
| SG | 10201809503 R | 10/2018 | |
| WO | 2018/121347 A1 | 7/2018 | |
| WO | 2018/136513 | 7/2018 | |
| WO | 2018/136516 | 7/2018 | |
| WO | WO-2019006085 A1 * | 1/2019 | H04W 24/02 |
| WO | 2019/099268 | 5/2019 | |
| WO | WO-2019099268 A1 * | 5/2019 | H04L 45/245 |
| WO | 2019/132607 | 7/2019 | |
| WO | 2020/33381 | 2/2020 | |
| WO | 2021/182902 | 9/2021 | |
| WO | WO-2021182902 A1 * | 9/2021 | H04L 1/1685 |

OTHER PUBLICATIONS

Sharan Naribole: "Multi-Link Operation Channel Access Discussion", IEEE Draft; vol. 802.11 EHT; 802.11be, No. 2, Oct. 31, 2019, 19 pages.
Yonggang Fang (ZTE TX): "Multi-link channel access for non-STR MLD", IEEE Draft; vol. 802.11 EHT; 802.11be, Aug. 25, 2020, 17 pages.
International Search Report and Written Opinion for PCT/CN2020/088757, dated Jul. 17, 2020 9 pages.
MediaTek Inc. "Dual Connectivity Uplink," 3GPP TSG-RAN2 #85 Meeting R2-140803, Prague, Czech Republic, Feb. 10-14, 2014, 2 pages.
Co-Pending U.S. Appl. No. 17/647,567, Non-Final Office Action dated Mar. 20, 2024, 14 pages.
Co-Pending EP Application No. 20924271.8, Extended European Search Report dated May 23, 2023, 13 pages.
Qualcomm, "MLO: Sync PPDUs", IEEE Draft; 11-20-0026-00-00BE-MLO-SYNC-PPDUS, IEEE-SA Mentor, Piscataway, NJ USA vol. 802.11 EHT; 802.11be, Jan. 13, 2020 10 pages.
Samsung "Multi-link Channel Access Follow-up", vol. 802.11 EHT; 802.11be, No. 4, EEE-SA Mentor, Piscataway, NJ USA, Jan. 21, 2020 21 pages.
Broadcom, Inc. "MLO-Synch-Transmission", IEEE Draft; IEEE-SA Mentor, Piscataway, NJ USA, vol. 802.11 EHT; 802.11be, No. 1, Jan. 21, 2020, 59 pages.
Co-Pending EP Application No. 19936862.2 Extended Search Report, dated Jun. 21, 2022 9 pages.
Intel Corp "Low latency service in 802. 11be" vol. 802.11 EHT; 802.11be, Mar. 10, 2020, 13 pages.
Fang et al. "Channel Access Category" 11-20-0468-00-00BE-Channel-Access-Category, IEEE-SA Mentor, Piscataway, NJ USA, vol. 802.11 EHT; 802.11be, Mar. 16, 2020, 12 pages.
Subir Das (PL): "Priority Access Support for NS/EP Services", IEEE Draft; 11-20-0021-01-00-Be-Priority-Access-Support -For-NS-EP-Services, IEEE-SA Mentor, Piscataway, NJ USA, vol. 802. 11 EHT; 802.11be, No. 1, Jan. 14, 2020, 15 pages.
Co-Pending EP Application No. 2083734.6 Extended Search Report, dated Sep. 26, 2022 10 pages.
USPTO, Non-Final Office Action for U.S. Appl. No. 17/647,563, mailed on Feb. 1, 2024, 17 pages.
USPTO, Non-Final Office Action for U.S. Appl. No. 17/572,316, mailed on Feb. 28, 2024, 56 pages.
USPTO, Final Office Action for U.S. Appl. No. 17/647,563, mailed on Apr. 8, 2024, 18 pages.
CNIPA, First Office Action for Chinese Application No. 201980098356.4, mailed on May 29, 2024, 31 pages with unofficial English translation.
CNIPA, First Office Action for Chinese Application No. 202080098359.0, mailed on Jun. 19, 2024, 47 pages with unofficial English translation.

* cited by examiner

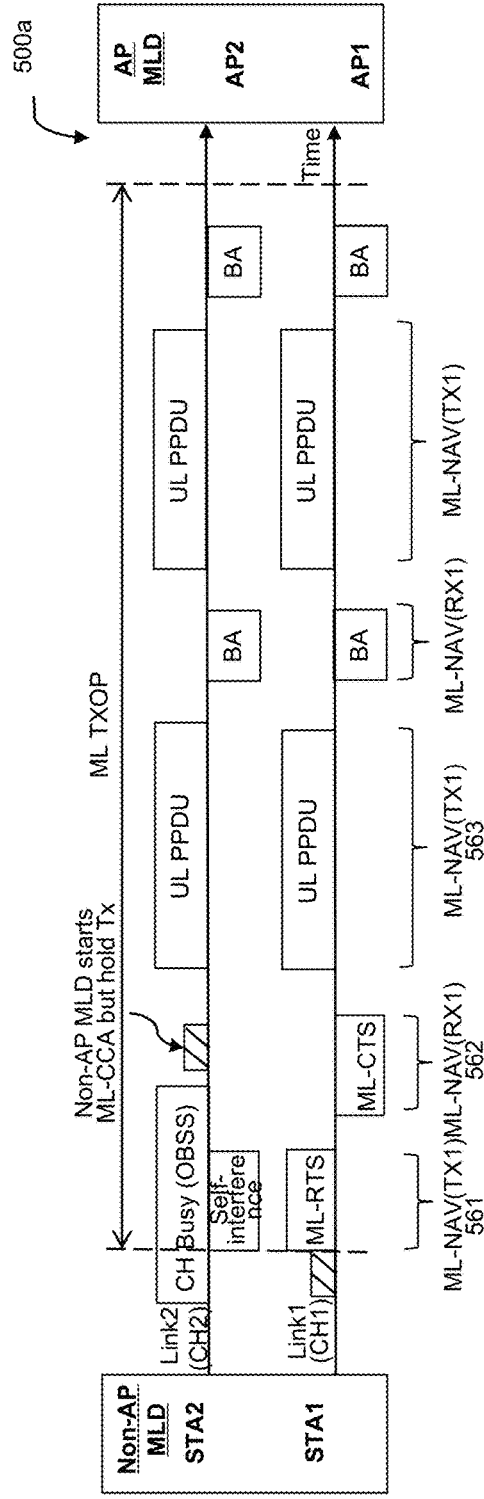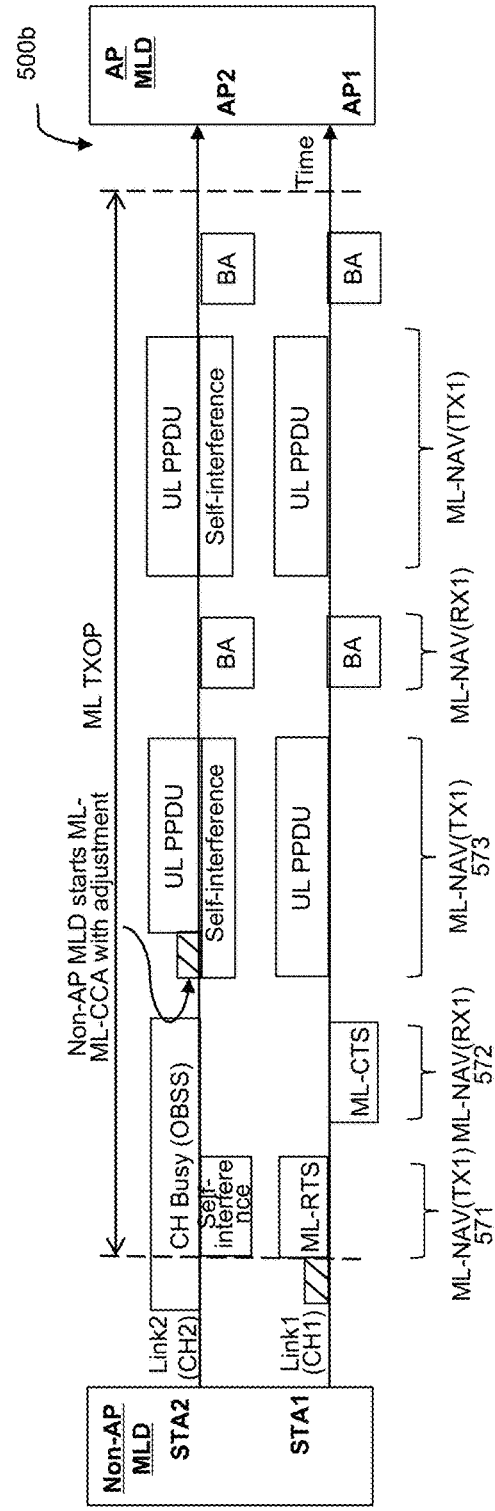
FIG. 5A
FIG. 5B

ADJUSTABLE MULTI-LINK CLEAR CHANNEL ASSESSMENT FOR WIRELESS COMMUNICATION NETWORKS

CROSS REFERENCE TO RELATED APPLICATIONS

This patent document is a continuation of PCT/CN2020/088757, filed May 6, 2020 which claims the benefit of priority under 35 U.S.C. § 119(a) and the Paris Convention of International Patent Application No. PCT/CN2020/078991, filed in Mar. 12, 2020, and International Patent Application No. PCT/CN2019/095428, filed on Jul. 10, 2019. The entire contents of the before-mentioned patent applications are incorporated by reference as part of the disclosure of this application.

TECHNICAL FIELD

This patent document is directed generally to wireless communications.

BACKGROUND

Wireless communication technologies are moving the world toward an increasingly networked society. In many user cases and deployment scenarios like factory automations, gaming, Artificial Intelligence (AI), Virtual Reality (VR), Augmented Reality (AR), etc., it can require the rapid growth of wireless communications to provide low latency connections for such application services.

Wireless communication systems can include a network of one or more access points (APs) that communicate with one or more wireless stations (STAs). An AP may emit radio signals that carry management information, control information or user data to one or more STAs. A STA may transmit radio signals to an AP in the same frequency channel using a technique such as time division duplexing (TDD) or in a different frequency using a technique such as frequency division duplexing (FDD).

The Institute of Electrical and Electronics Engineers (IEEE) 802.11 specifies a specification for a wireless local area network (WLAN) over radio channels in license-exempt bands. The basic unit of a WLAN is a basic service set (BSS). An infrastructure BSS may include the BSS with stations through associating with an Access Point (AP) to connect to the wired network or Internet. In an infrastructure BSS, both an access point and a station may share the same frequency channel via using Carrier Sensing Multiple Access with Collision Avoidance (CSMA/CA) technology, a kind of TDD mechanism, for multiple access and data transmission. In addition, an access point and a station may utilize the under developing multi-link technology to perform simultaneous transmission and reception or simultaneous transmission and reception constraint communications.

SUMMARY

This document discloses methods, systems, and devices related to digital wireless communications, and more specifically, to techniques related establishing a multi-link network allocation vector for transmission and/or reception and an adjustable clear channel assessment mechanism to enhance a clear channel assessment in the constraint of multi-link communication to facilitate multi-link channel access so as to reduce the access delay, improve transmission reliability, and increase transmission throughput.

In one exemplary aspect, a method for wireless communication is disclosed. The method includes identifying, by a wireless device, that a first wireless link and a second wireless link of the wireless device are in a detecting state at a first time. The method also includes modifying, by the wireless device, a multi-link channel availability assessment procedure of a second wireless link based on detecting a transmission state of the first wireless link at the first time.

In another exemplary aspect, a method for wireless communication is disclosed. The method includes identifying, by a wireless device, that a first wireless link and a second wireless link of the wireless device are in a detecting state at a first time. The method also includes responsive to detecting that the first wireless link is in a transmission state at the first time, adjusting, by the wireless device, a multi-link channel availability assessment procedure for the second wireless link based on the transmission state of the first wireless link and initiating the multi-link channel availability assessment procedure for the second wireless link.

In another exemplary aspect, a method for wireless communication is disclosed. The method includes identifying, by a wireless device, that a first wireless link is receiving data and a second wireless link of the wireless device is in a detecting state at a first time. The method also includes responsive to detecting that the second wireless link is in the detecting state at a second time, modifying, by the wireless device, initiation of a multi-link channel availability assessment procedure for the second wireless link.

In another exemplary aspect, a method for wireless communication is disclosed. The method includes initiating, by a wireless device, a multi-link network reception period at a first time, wherein a first wireless link receives data during the multi-link network allocation vector reception period and a second wireless link is in a detecting state at the first time. The method also includes initiating, by the wireless device, a multi-link network allocation vector transmission period at a second time, wherein the first wireless link sends data during the multi-link network transmission period and the second wireless link is in the detecting state at the second time. The method also includes adjusting, by the wireless device, a multi-link channel availability assessment procedure for the second wireless link responsive to detecting that the second wireless channel is in the idle state at the second time.

In another exemplary aspect, a method for wireless communication is disclosed. The method includes initiating, by a wireless device, a first multi-link network reception period at a first time, wherein a first wireless link receives a first set of data during the first multi-link network reception period and a second wireless link is in a detecting state at the first time. The method also includes initiating, by the wireless device, a multi-link network transmission period at a second time, wherein the first wireless link sends data during the multi-link network transmission period and the second wireless link is in the active state at the second time. The method also includes initiating, by the wireless device, a second multi-link network reception period at a third time, wherein the first wireless link receives a second set of data during the second multi-link network reception period and the second wireless link is in the detecting state at the first time. The method also includes adjusting, by the wireless device, a multi-link channel availability assessment procedure for the second wireless link responsive to detecting that the second wireless link is in the detecting state at the third time.

In another exemplary aspect, a method for wireless communication is disclosed. The method includes initiating, by a wireless device, a first multi-link network transmission period at a first time, wherein a first wireless link transmits a first set of data during the first multi-link network transmission period and a second wireless link is in a detecting state during the first multi-link network transmission period. The method also includes initiating, by the wireless device, a multi-link network reception period at a second time, wherein the first wireless link receives data during the multi-link network reception period and the second wireless link is in the detecting state during the multi-link network reception period. The method also includes adjusting, by the wireless device, a multi-link channel availability assessment procedure for the second wireless link to detect that a second wireless channel transitions into the idle state during the multi-link network reception period.

In another exemplary aspect, a method for wireless communication is disclosed. The method includes initiating, by a wireless device, a first multi-link network transmission period at a first time, wherein a first wireless link transmits a first set of data during the first multi-link network transmission period and a second wireless link is in a detecting state during the first multi-link network transmission period. The method also includes initiating, by the wireless device, a multi-link network reception period at a second time, wherein the first wireless link receives data during the multi-link network reception period and the second wireless link is in the active state during the multi-link network reception period. The method also includes initiating, by the wireless device, a second multi-link network transmission period at a third time, wherein the first wireless link transmits a second set of data during the second multi-link network transmitting period and the second wireless link is in the detecting state prior to the third time. The method also includes adjusting, by the wireless device, a multi-link channel availability assessment procedure for the second wireless link to detect that a second wireless channel transitions into the idle state prior to the third time.

In another exemplary aspect, a method for wireless communication is disclosed. The method includes initiating, by a wireless device, a first multi-link network transmission period at a first time, wherein a first wireless link transmits a first set of data during the first multi-link network transmission period and a second wireless link is in a detecting state during the first multi-link network transmission period. The method also includes detecting, by the wireless device, that data was not received by the first wireless link during a multi-link network reception period at a second time, wherein the second wireless link is in the detecting state during the multi-link network reception period. The method also includes adjusting, by the wireless device, a multi-link channel availability assessment procedure for the first wireless link and the second wireless link responsive to detecting that the data was not received by the first wireless link during the multi-link network reception period at the second time.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: identifying, by a wireless device, that a first wireless link and a second wireless link of the wireless device are in a detecting state at a first time; and modifying, by the wireless device, a multi-link channel availability assessment procedure of a second wireless link based on detecting a transmission state of the first wireless link at the first time.

2. The solution of clause 1, wherein the wireless device is one of an access point (AP) multi-link device (MLD) or a non-AP MLD capable of performing in a simultaneous transmission and reception constraint (STR-constraint) operation.

3. The solution of clause 1, further comprising: determining, by the wireless device, that the first wireless link is in the transmission state at a second time, wherein modifying the multi-link channel availability assessment procedure includes deferring initiation of the multi-link channel availability assessment procedure for the second wireless link to a third time.

4. The solution of clause 1, wherein detecting that the first wireless link is in the transmission state includes determining that a network allocation vector (NAV) value for the first wireless link wireless link of the wireless device does not equal to zero.

5. The solution of clause 1, further comprising: determining, by the wireless device, that a first multi-link NAV transmission period has expired; initiating, by the wireless device, the multi-link channel availability assessment procedure and a back off procedure for the second wireless link at a time corresponding to the expiration of the first multi-link NAV transmission period; and transmitting, by the wireless device, a first message over the second wireless link responsive to detecting an expiration of the back off counter.

6. A solution for wireless communication, comprising: identifying, by a wireless device, that a first wireless link and a second wireless link of the wireless device are in a busy state at a first time; and responsive to detecting that the first wireless link is in a transmission state at the first time, adjusting, by the wireless device, a multi-link channel availability assessment procedure for the second wireless link based on the transmission state of the first wireless link and initiating the multi-link channel availability assessment procedure for the second wireless link.

7. The solution of clause 6, further comprising: responsive to detecting that first wireless link and the second wireless link are in a transmission state at a second time, adjusting, by the wireless device, a multi-link channel availability assessment procedure for a third wireless link based on the transmission state of the first wireless link and the second wireless link.

8. The solution of clause 7, further comprising: detecting, by the wireless device, a channel availability of the third wireless link at the third time via a multi-link channel availability assessment procedure for the third wireless link.

9. The solution of clause 6, further comprising: establishing, by the wireless device, a first multi-link NAV transmission period at the first time, wherein initiation of the multi-link channel availability assessment procedure for the second wireless link and a third wireless link is based on first multi-link NAV transmission period.

10. The solution of clause 6, further comprising: establishing, by the wireless device, a second multi-link NAV transmission period at the second time, wherein initiation of the multi-link channel availability assessment procedure for a third wireless link is based on the first multi-link NAV transmission period and the second multi-link NAV transmission period.

11. The solution of clause 6, wherein the multi-link channel availability assessment procedure for any wireless link of the wireless device includes a modified received signal strength measurement based on a measured received signal strength resulting from transmission of other messages on a first channel.

12. The solution of clause 6, wherein the multi-link channel availability assessment procedure includes transmitting a first message on the second wireless link responsive to a back off counter reaching zero.

13. The solution of clause 11, wherein the modified received signal strength is indicated by the wireless device.

14. The solution of clause 11, further comprising: generating, by the wireless device, an interference measurement matrix that includes the measured signal strengths of each transmitting wireless link of the wireless device measured by a non-transmitting link.

15. The solution of clause 14, further comprising: deriving, by the wireless device, a modified received signal strength in the multi-link channel availability assessment procedure on any wireless link based on the interference measurement matrix.

16. The solution of clause 14, further comprising: modifying, by the wireless device, an energy detection threshold (EDT) of a wireless link based on the interference measurement matrix.

17. The solution of clause 6, further comprising: transmitting, by the wireless device, a first downlink message on the first wireless link and a second downlink message on the second wireless link simultaneously responsive to completion of the multi-link channel availability assessment procedure 18. The solution of clause 6, further comprising: transmitting, by the wireless device, a first uplink message on the first wireless link and a second uplink message on the second wireless link simultaneously responsive to completion of the multi-link channel availability assessment procedure.

19. The solution of clause 6, further comprising: transmitting, by the wireless device, a first uplink message on the first wireless link and a second uplink message on the second wireless link separately responsive to completion of the multi-link channel availability assessment procedure.

20. The solution of clause 6, further comprising: transmitting, by the wireless device, a first uplink message on the first wireless link and a second uplink message on the second wireless link simultaneously responsive to completion of the multi-link channel availability assessment procedure that includes a joint back off procedure for both the first wireless link and the second wireless link.

21. A solution for wireless communication, comprising: identifying, by a wireless device, that a first wireless link is receiving data and a second wireless link of the wireless device is in a busy state at a first time; and responsive to detecting that the second wireless link is in the busy state at a second time, modifying, by the wireless device, initiation of a multi-link channel availability assessment procedure for the second wireless link.

22. The solution of clause 21, wherein modifying initiation of the multi-link channel availability assessment procedure for the second wireless link includes initiating a back off procedure for the second wireless link at the second time.

23. The solution of any of clauses 21 and 22, further comprising: deferring, by the wireless device, initiation of channel access and transmission of a first message on the second wireless link until completion of the reception of data at the first wireless link.

24. The solution of clause 23, further comprising: determining, by the wireless device, that the first wireless link has completed the reception of data based on detecting that a NAV value of the first wireless link equals zero.

25. The solution of clause 21, further comprising: initiating, by the wireless device, a second back off procedure for the third wireless link at the second time; and transmitting, by the wireless device, a first message at the second wireless link and a second message at the third wireless link simultaneously responsive to detection of a completion of a first NAV transmission period.

26. A solution for wireless communication, comprising: initiating, by a wireless device, a multi-link network reception period at a first time, wherein a first wireless link receives data during the multi-link network allocation vector reception period and a second wireless link is in a busy state at the first time; initiating, by the wireless device, a multi-link NAV transmission period at a second time, wherein the first wireless link sends data during the multi-link network transmission period and the second wireless link is in the busy state at the second time; and adjusting, by the wireless device, a multi-link channel availability assessment procedure for the second wireless link responsive to detecting that the second wireless link is in the idle state at the second time.

27. The solution of clause 26, wherein adjusting the channel availability assessment procedure for the second wireless link includes initiating a back off counter for the second wireless link at the second time.

28. The solution of clause 26, further comprising: receiving, by the wireless device, a downlink message on each of the first wireless link and the second wireless link simultaneously at a third time responsive to completion of the multi-link channel availability assessment procedure for the second wireless link.

29. A solution for wireless communication, comprising: initiating, by a wireless device, a first multi-link network reception period at a first time, wherein a first wireless link receives a first set of data during the first multi-link network reception period and a second wireless link is in a busy state at the first time; initiating, by the wireless device, a multi-link network transmission period at a second time, wherein the first wireless link sends data during the multi-link network transmission period and the second wireless link is in the active state at the second time; initiating, by the wireless device, a second multi-link network reception period at a third time, wherein the first wireless link receives a second set of data during the second multi-link network reception period and the second wireless link is in the busy state at the third time; and adjusting, by the wireless device, a multi-link channel availability assessment procedure for the second wireless link responsive to detecting that the second wireless link is in the idle state at the third time.

30. The solution of clause 29, wherein adjusting the channel availability assessment procedure for the second wireless link includes initiating the channel availability assessment procedure for the second wireless link at the third time.

31. A solution for wireless communication, comprising: initiating, by a multi-link station, a first multi-link network transmission period at a first time, wherein a first wireless link transmits a first set of data during the first multi-link network transmission period and a second wireless link is in a busy state during the first multi-link network transmission period; initiating, by the multi-link station, a multi-link network reception period at a second time, wherein the first wireless link receives data during the multi-link network reception period and the second wireless link is in the busy state during the multi-link network reception period; and adjusting, by the multi-link station, a multi-link channel availability assessment procedure for the second wireless link to detect that the second wireless channel transitions into the idle state during the multi-link network reception period.

32. The solution of clause 31, wherein the multi-link station is a device capable of performing in a simultaneous transmission and reception constraint operation.

33. The solution of clause 31, wherein adjusting the channel availability assessment procedure for the second wireless link includes initiating a back off counter for the second wireless link during the multi-link network reception period.

34. The solution of clause 31, further comprising: transmitting, by the multi-link station, an uplink message on each of the first wireless link and the second wireless link simultaneously at a third time during a second multi-link network transmission period, wherein transmission of the uplink messages is performed responsive to completion of the multi-link channel availability assessment procedure for the second wireless link.

35. A solution for wireless communication, comprising: initiating, by a multi-link station, a first multi-link network transmission period at a first time, wherein a first wireless link transmits a first set of data during the first multi-link network transmission period and a second wireless link is in a detecting state during the first multi-link network transmission period; initiating, by the multi-link station, a multi-link network reception period at a second time, wherein the first wireless link receives data during the multi-link network reception period and the second wireless link is in the active state during the multi-link network reception period; initiating, by the multi-link station, a second multi-link network transmission period at a third time, wherein the first wireless link transmits a second set of data during the second multi-link network transmitting period and the second wireless link is in the detecting state prior to the third time; and adjusting, by the multi-link station, a multi-link channel availability assessment procedure for the second wireless link to detect that the second wireless channel transitions into the idle state prior to the third time.

36. The solution of clause 35, wherein adjusting the channel availability assessment procedure for the second wireless link includes: initiating, by the multi-link station, a back off counter for the second wireless link at the third time; and responsive to expiry of the back off counter, transmitting, by the multi-link station, a third set of data during the second multi-link network transmission period.

37. A solution for wireless communication, comprising: initiating, by a multi-link station, a first multi-link network transmission period at a first time, wherein a first wireless link transmits a first set of data during the first multi-link network transmission period and a second wireless link is in a detecting state during the first multi-link network transmission period; detecting, by the multi-link station, that data was not received by the first wireless link during a multi-link network reception period at a second time, wherein the second wireless link is in the detecting state during the multi-link network reception period; adjusting, by the multi-link station, a multi-link channel availability assessment procedure for the first wireless link and the second wireless link responsive to detecting that the data was not received by the first wireless link during the multi-link network reception period at the second time.

38. The solution of clause 37, wherein adjusting the multi-link channel availability assessment procedure for the first wireless link and the second wireless link includes initiating a joint back off counter for the first wireless link and the second wireless link at a third time.

39. The solution of clause 37, wherein adjusting the multi-link channel availability assessment procedure for the first wireless link and the second wireless link includes transmitting a second set of data by the first wireless link during a second multi-link network transmission period and transmitting a third set of data by the second wireless link during the second multi-link network transmission period.

40. An apparatus for wireless communication comprising a processor that is configured to carry out the solution of any of clauses 1 to 39.

41. A non-transitory computer readable medium having code stored thereon, the code when executed by a processor, causing the processor to implement a solution recited in any of clauses 1 to 39.

The details of one or more implementations are set forth in the accompanying attachments, the drawings, and the description below. Other features will be apparent from the description and drawings, and from the clauses.

BRIEF DESCRIPTION OF THE DRAWINGS

FIG. 5A illustrates an example signaling process of simultaneous transmission and reception constraint station initiated adjustable multi-link clear channel assessment during ML-NAV for reception.

FIG. 5B illustrates an example signaling process of simultaneous transmission and reception constraint multi-link station initiated adjustable multi-link clear channel assessment during ML-NAV for transmission.

DETAILED DESCRIPTION

Figure 1:
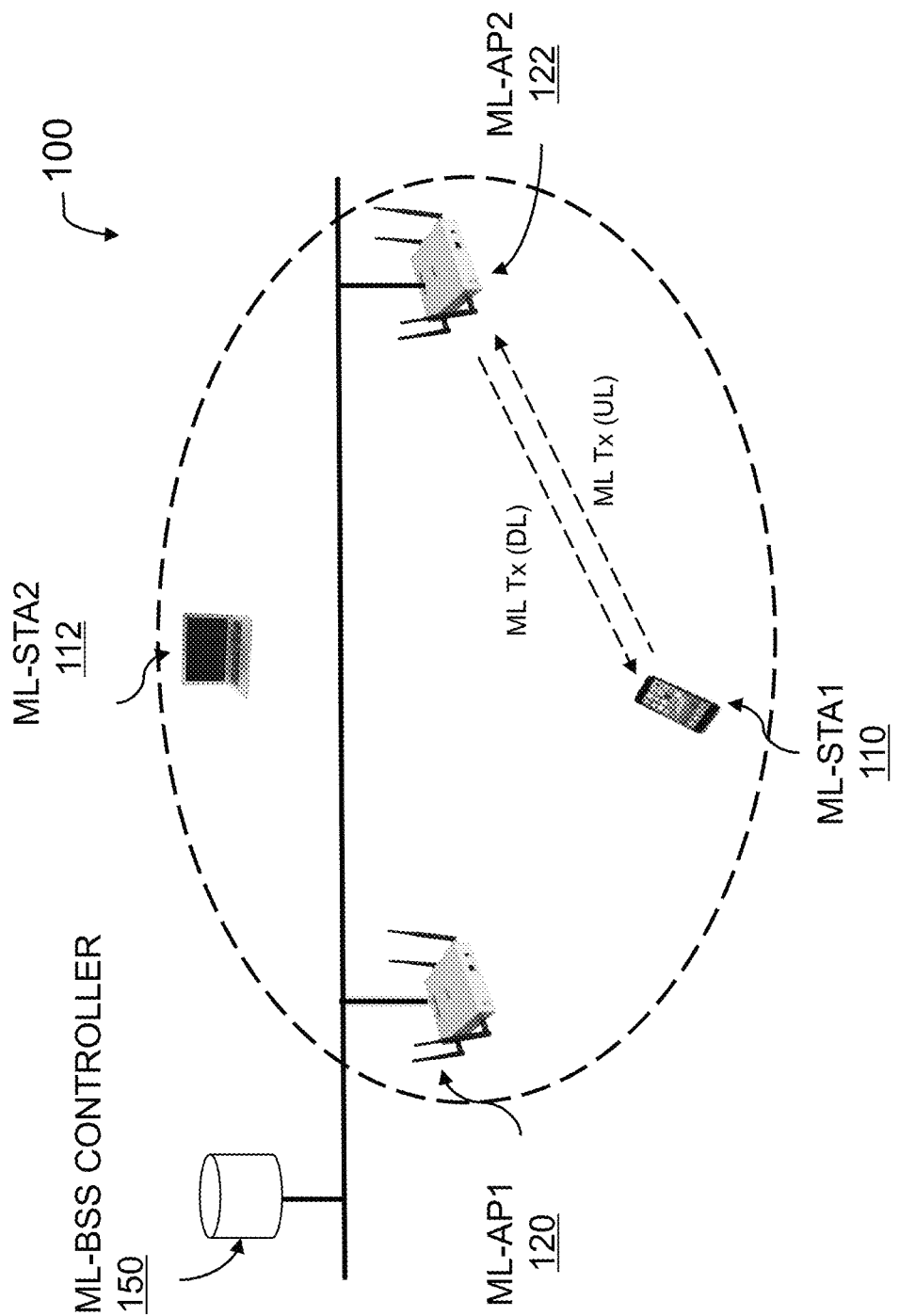
FIG. 1 illustrates an example multi-link access network including multi-link stations.

Section headings are used in the present document only for ease of understanding and do not limit scope of the embodiments to the section in which they are described. Furthermore, while embodiments are described with reference to wireless local access network (WLAN) examples, the disclosed techniques may be applied to wireless systems that use protocols other than WLAN or IEEE802.11 protocols.

Wireless local area communication is fast becoming a popular mechanism to communicate with each other directly or via a network such as the internet. Multiple wireless devices (e.g., smartphones, tablets, etc.) may attempt to transmit and receive data on a shared communication spectrum in an environment (e.g., airport, homes, buildings, sports venues, etc.). Additionally, wireless devices (e.g., sensors, cameras, control units, etc.) are increasingly utilized in networks for various applications (e.g., factory automations, vehicle communications etc.).

In some cases, transmission of data is based on an air interface as specified by the Institute of Electrical and Electronics Engineers (IEEE), standard 802.11 series. In this specification, devices may share a wireless medium that include a certain set of rules. In IEEE 802.11, the basic service set (BSS) is a building block of a Wireless Local Area Network (WLAN). Wireless stations (also called stations) associated in the radio coverage area may establish a BSS and provide the basic service of a WLAN.

IEEE 802.11 specifies wireless access protocols for operation on a license exempt and/or shared spectrum. A wireless station can operate on a channel in license exempt frequency band (e.g., 2.4 GHz or 5 GHz), or shared frequency band with other services (e.g., 6 GHz).

When operating on a license exempt or shared spectrum, transmission and reception of wireless messages may be unreliable due to interference from other stations located within the same coverage area, such as hidden node transmissions or "visible" nodes attempting to utilize the same shared communication medium for transmissions.

The device operated on the unlicensed frequency band can utilize a carrier sensing multiple access with collision avoidance (CSMA/CA) mechanism to control the multiple medium access based on IEEE802.11 specification. Each station may implement a CSMA/CA function. Before access to the wireless medium, the station can sense the medium occupancy status using CSMA/CA. If the station determines that the medium is busy, it may need to wait and retry sensing the medium at a later time. If the station senses the medium in idle, the station may wait for some inter frame space (IFS) and then enter the contention window (CW). In order to support multiple stations to access to the medium, each station may back off a random time before transmitting over the medium to reduce the collision and distribute the medium access evenly. The back off time may be defined as:

$$\text{back off Time} = \text{Random}(\ ) \times \text{aSlotTime} \qquad \text{Eq. (1)}$$

Where Random( )=Pseudo random integer uniformly distributed over the interval [0, CW], and CW is an integer:

$$aCWmin \leq CW \leq aCWmax \qquad \text{Eq. (2)}$$

The current CSMA/CA mechanism specified in IEEE 802.11 standard may create a significant channel access delay in each transmission and causes an issue of medium utilization efficiency. When a large number of stations share the same medium and are going to transmit simultaneously, the CSMA/CA mechanism suffers on unreliable transmissions (e.g., more transmission packet loss, longer access delay, and larger jittering in an unstable radio environment). Such unreliable transmissions may decrease user experience and limit the performance of applications that require low latency and high reliability over an IEEE802.11 wireless access network.

In some cases, IEEE802.11 standards allow for a station to associate with an access point over one wireless link. This may cause a difficulty for the station to receive a reliable transmission when the associated wireless link is congested or interfered, ether at the station side or the access point side. In other cases, this restriction in IEEE802.11 standards limit wireless communication between the station and the access point if the associated wireless link is busy.

The present embodiments can relate to adjustable multi-link clear channel assessment (ML-CCA) mechanisms to reduce the channel access latency, improve transmission reliability, and increase transmission throughput in WLANs.

FIG. 1 illustrates an example WLAN with infrastructure BSS configuration. The infrastructure BSS WLAN may include multiple ML stations (i.e., ML-STAs or non-AP ML devices), such as, for example, ML-STA1 110 and ML-STA2 112. A ML station may be in the coverage of a first ML access point (i.e. ML-AP or called AP ML device), such as ML-AP1 120 and/or a second ML access point ML-AP2 122. ML-AP1 120 can form an infrastructure ML-BSS1 and ML-AP2 122 can form an infrastructure ML-BSS2. ML-AP1 120 and ML-AP2 122 may be interconnected via a switch through a distribution system (DS) to form a ML-BSS 100. A ML-AP1 120 and a ML-AP2 122 may be coordinated via a ML-BSS controller 150 for ML operation across multiple ML-APs.

In some embodiments, a ML-STA (e.g., ML-STA1 110) with multiple radios can be configured to operate on multiple channels (or OFDMA sub-channels) in the same frequency band or different bands to communication with a ML-AP (e.g., ML-AP1 122). A ML-STA can associate with one or more ML-APs in the ML-BSS coverage for ML communication.

An enabled active link of ML can operate in one of a transmitting state (TX), a receiving state (RX), and a listening state (i.e. the state of detecting (DT) the transmissions from others). An enabled active link operation may be independent to, or constrained by, the operation of other enabled active links based on the operation mode.

The simultaneous transmission and reception (STR) operation mode can refer to an operation mode that allows for transmission on an enabled active link that is independent to (non-interruptible on) the operation on another enabled active link.

The simultaneous transmission and reception constraint (STR-constraint) operation mode can refer to that the operation on a STR-constraint link may depend on the operational state on another STR-constraint link(s), i.e. a transmission on an enabled active link can be constrained if it causes the reception interruption on another enabled active link. Accordingly, it can be assumed that a link which a ML-CCA is associated to is an enabled active link.

A ML device can be configured as all links operated on STR operation, a part of links on STR operation and another part of links on STR-constraint, and/or all links on STR-constraint operation.

In some embodiments, a ML-AP 122 and a ML-STA 110 can leverage ML operation for a simultaneous transmission and reception (STR) over one or multiple radio frequency channels to reduce the access latency, improve the transmission reliability and/or increase the transmission throughput under the coordination of a ML-MBSS Controller 150. A ML communication may include bi-directional transmission between a ML-STA and a ML-AP through a portion of ML-links or all ML-links.

In some embodiments, a ML-AP 122 and a ML-STA 110 may leverage ML operation on non-simultaneous transmission and reception constraint (STR-constraint) operation over a part or all ML-links.

Figure 2A:
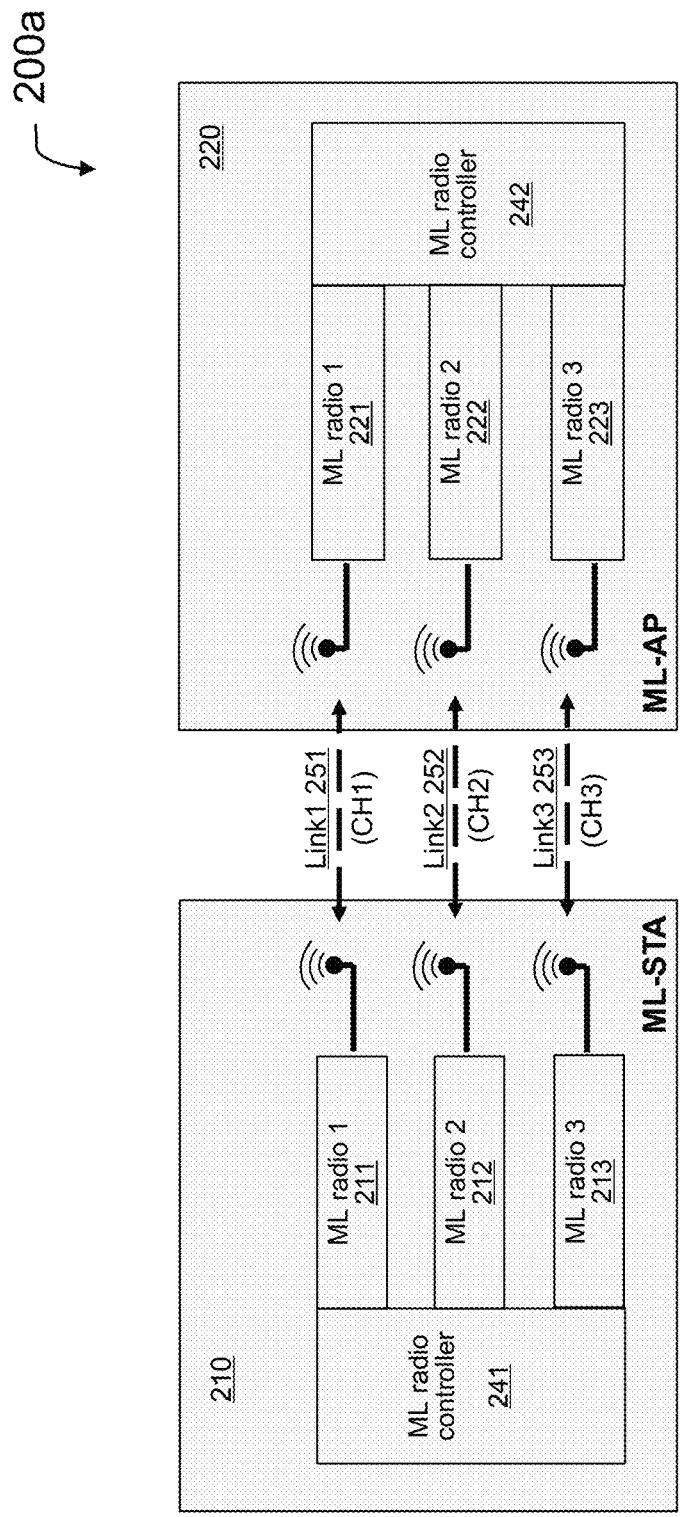
FIG. 2A illustrates an example reference architecture of a multi-link station and a multi-link access point, according to a first embodiment.
Figure 2B:
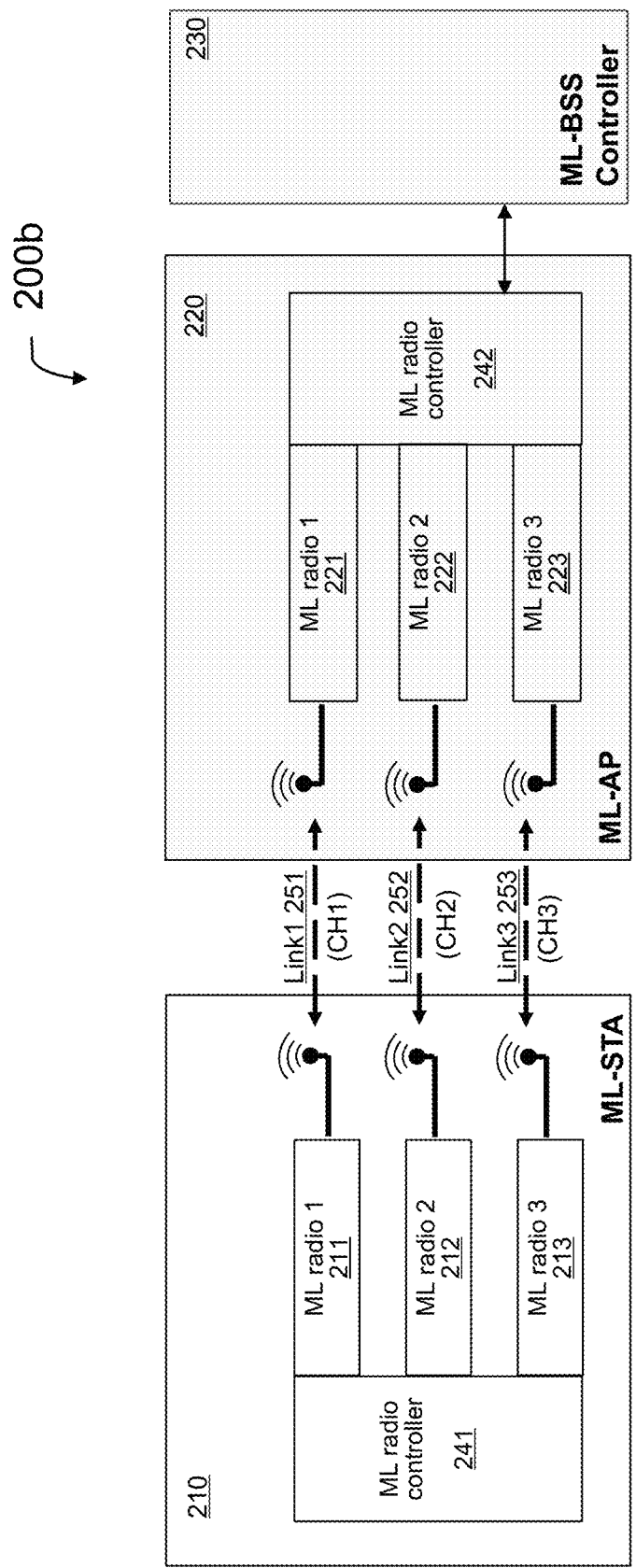
FIG. 2B illustrates an example reference architecture of a multi-link station and a multi-link access point, according to a second embodiment.

FIGS. 2A-2B illustrate example ML system architectures for ML-STA and ML-AP. In the first embodiment as shown in FIG. 2A, the ML system 200a can include a ML-STA 210 and a ML-AP 220.

As shown in FIG. 2A, a ML-STA 210 can include ML radios 211, 212 and 213. Each radio of ML-STA 210 may include an 802.11 PHY and a partial MAC (i.e., a lower MAC (MAC-L)). A ML radio 211 may operate on a wireless channel (CH1) to establish a radio link 251 to a ML-AP 220. Similarly, a ML radio 212 and 213 may operate on wireless channels (CH2 and CH3) respectively to establish radio link2 252 and link3 253 to a ML-AP 220. A ML-STA 210 may include a ML radio controller 241 which may consist of a common 802.11 MAC (i.e., upper MAC (MAC-U)) and a management entity to manage the ML operation of ML-STA 210.

The ML-AP 220 may include ML radios 221, 222 and 223. Each radio of ML-AP 220 may include an 802.11 PHY and a partial MAC (i.e., MAC-L). A radio 221 of ML-AP 220 may operate on a wireless channel (CH1) to establish a radio link 251 to the ML-STA 210. Similarly, ML radios 222 and 223 of ML-AP may operate on wireless channels (CH2 and CH3) respectively to establish radio link2 252 and link3 253 to ML-STA 210. The ML-AP 220 may have a ML radio controller 242 which may consist of a common 802.11 MAC (i.e. MAC-U) and a management entity to manage the ML operation of ML-AP 220.

In the second embodiment as shown in FIG. 2B, the ML system 200b may include a ML-STA 210, a ML-AP 220 and a ML-BSS controller 230. As shown in FIG. 2B, the ML-STA 210 can include ML radios 211, 212 and 213. Each radio of ML-STA 210 may include an 802.11 PHY and a partial MAC (i.e., MAC-L). A radio 211 may operate on a wireless channel (CH1) to establish a radio link1 231 to a ML-AP 220. Similarly, ML radios 212 and 213 may operate on wireless channels (CH2 and CH3) respectively to establish radio link2 252 and link3 253 to a ML-AP 220. A ML-STA 210 may have a ML radio controller 241, which can consist of a common 802.11 MAC (MAC-U) and a management entity to manage the ML operation of ML-STA 210.

A ML-AP 220 may include ML radios 221, 222 and 223. Each radio of ML-AP 220 may include an 802.11 PHY and a partial MAC, i.e. MAC-L. A ML radio 221 may operate on a wireless channel (CH1) to establish a radio link 251 to the ML-STA 210. Similarly, ML radios 222 and 223 may operate on wireless channels (CH2 and CH3) respectively to establish radio link2 252 and link3 253 to a ML-STA 210. The ML-AP 220 may have a ML radio controller 242 which may consist of a common 802.11 MAC (i.e. MAC-U) and a management entity to manage the ML operation of ML-AP 220.

The ML-BSS controller 230, which can be integrated with a ML-AP 220 or located separately as an individual network entity, may coordinate one or more ML radio controller 242 for ML operation across multiple ML-APs.

The ML 251, 252 and 253 may be wireless links that can operate on radio channels in the same frequency band or different frequency bands, such as at a 2.4 GHz, 5 GHz, 6 GHz band, etc. The links can have the same channel bandwidth, such as 20 MHz, 40 MHz, 80 MHz, 160 MHz, etc. Alternatively, the links may allow different channel bandwidth combinations, such as 160 MHz+160 MHz+20 MHz, or 160 MHz+80 MHz+20 MHz, etc.

A ML-STA may associate with a ML-AP over any link to establish ML communication between them. During the ML association, a ML-STA and a ML-AP can exchange the ML capability information and determine the supported ML operation.

A ML-STA may turn on a radio to listen to the transmissions in the unlicensed frequency band and search for Beacon frames. A ML-STA may turn on multiple ML-radios for fast searching over multiple channels simultaneously to reduce the searching time. If the ML-STA acquires a ML Beacon frame, the ML-STA may determine whether it can associate with this ML-AP through the ML capability information broadcast in Beacon frames.

A wireless device can use a clear channel assessment (CCA) mechanism to determine whether or not a channel is being occupied by other transmissions. In IEEE802.11, two types of CCA detection mechanisms are defined.

A first type of CCA detection can include Preamble Detection (PD). In PD, this CCA mechanism may detect the preamble signal of IEEE802.11 frame. Once the detected preamble signal strength is equal to or greater than PD Threshold (PDT, i.e. −82 dBm), the CCA can declare the channel is busy, i.e. being occupied by another transmission. If the detected preamble signal strength is less than PDT, the channel can be declared as idle and the wireless device is able to transmit a frame on this cleared channel.

A second type of CCA detection can include Energy Detection (ED). In ED, this CCA mechanism may detect the energy of any type of wireless signal in the case that the preamble signal is not in the detection period or cannot be detected due to strong interference. If the CCA detects the signal strength measurement on the operating channel equal to or greater than the ED Threshold (EDT, i.e. −62 dBm), then the CCA can determine this channel as busy, i.e. being occupied by other transmission. If the detected signal strength is less than EDT, the channel may be declared as idle and the wireless device may transmit a frame on this cleared channel.

When the existing CCA mechanism is used on a link of ML device to detect the operating channel status, it may have special constraints for the STR-constraint ML operation.

As the STR-constraint ML operation does not allow simultaneous transmission and reception, the CCA mechanism of a STR-constraint link may be blocked by the self-inference or gets incorrect measurement result when the ML device is transmitting on another STR-constraint link. The impact on CCA mechanism of a STR-constraint link by the transmission on another link may depends on any of: a channel space between the channel which the STR-constraint link of ML device (or a "wireless device" or a "wireless ML device") performs CCA on and the channel which the STR-constraint link of ML device is transmitting a frame on; a physical space between the two radio modules for STR-constraint links of ML device; and a total transmit power from the STR-constraint link(s) of ML device.

To solve this problem of CCA in a link on STR-constraint ML operation, an adjustable CCA along with ML-NAV mechanism may be utilized.

A ML device may apply the adjustable ML-CCA mechanism on STR-constraint links. The ML-CCA on each link may perform independently without any channel assessment adjustment but may require some restriction on the channel assessment period.

The ML-CCA on a link may determine the self-interference strength measurement (e.g., RSSI) from the total signal strength measurement result on that channel, where the self-interference may be from other channel(s) which the STR-constraint link(s) of ML device is transmitting on. The ML-CCA of STR-constraint link of ML device may be able to measure this channel clearness only from other devices precisely.

The ML-CCA measurement on a STR-constraint link may use the adjusted Energy Detection Threshold (EDT) for the clear channel assessment.

$$\text{Adjusted EDT (AEDT)} = \text{EDT} + \text{the signal strength measurement of self-interference from other transmitting link(s) on STR-constraint operation of the ML device} \qquad \text{Eq. (3)}$$

In the STR-constraint operation mode, a ML Network Allocation Vector (ML-NAV) may be used to reflect the constraints on the operational state of those links in the STR-constraint operation mode.

ML-NAV (TX) may include the intra-MLD Tx constraint period. The duration of ML-NAV(TX) may be equal to the duration of PPDU to be transmitted on the link in STR-constraint operation mode plus SIFS time. When a link in the STR-constraint operation mode is set to ML-NAV(TX), the other links in the STR-constraint operation mode may be in either DT or TX state.

ML-NAV (RX) may include the intra-MLD Rx constraint period. The duration of ML-NAV(RX) may be equal to the duration of PPDU being received on the link in STR-constraint operation mode plus SIFS time. When a link in the STR-constraint operation mode is set to ML-NAV(RX), the other links in the STR-constraint operation mode may be in either DT or RX state.

When a link on STR-constraint operation mode is set to ML-NAV(TX), the adjustable ML-CCA on other links in the STR-constraint operation mode may be used to adjust the self-interference impact on the CCA process on the other links.

When a link on STR-constraint operation mode is set to ML-NAV(RX), the states of other links in the STR-constraint operation mode may not be changed to TX so as to prevent from the self-interferences to the receiving process on this link.

A ML device that is going to transmit a frame on a STR-constraint link may set the ML-NAV (TX) (i.e. intra-MLD Tx constraint period) to the duration of PPDU to be transmitted plus SIFS time. The ML-NAV (TX) may be the time duration that the ML device is transmitting a frame on a STR-constraint link plus SIFS time. The ML device may perform the adjustable ML-CCA process and channel access on other STR-constraint links in this period. This can assist the new transmission to be aligned up within the period of the existing transmissions on another STR-constraint link.

The adjustable ML-CCA on a link may measure the self-interference from another channel and adjust its CCA algorithm once the ML-NAV (TX) is set.

If the adjustable ML-CCA is disabled (i.e. not supported), no adjustment may be performed on this link. The adjustable ML-CCA may not perform CCA on a link during the ML-NAV (TX) since the measurement may be incorrect.

If the adjustable ML-CCA is enabled, the adjustment can be either an adjustment of ML-CCA measurement indicating that the adjustable ML-CCA on a link can deduct the self-interference coming from other channel from the total ML-CCA measurement result before assessment of channel clearness, or an adjustment of ML-CCA EDT that includes the adjustable ML-CCA on a link can compensate EDT by the measurement of self-interference from another channel and use the AEDT as the clear channel assessment threshold.

When the adjustable ML-CCA measurement is greater than the EDT (or the ML-CCA measurement is greater than the AEDT), the adjustable ML-CCA can identify this channel as busy, otherwise the channel may be determined as idle.

A ML device that is receiving a frame on a STR-constraint link can set the ML-NAV (RX), i.e. intra-MLD Rx constraint period, to the duration of the received PPDU plus SIFS time. The ML-NAV (RX) may be the time duration that the ML device is receiving a frame on a STR-constraint link plus SIFS time. The ML-NAV(RX) can be used on a link that performs adjustable ML-CCA and channel access when a PPDU is being received on another STR-constraint link of the ML device. ML-NAV(RX) may assist to hold the new transmission until the completion of receiving the current transmission on another link. Therefore, it can prevent interference from the new transmission with the existing communication.

The ML-NAV value, for either TX or RX, can decrease as the time elapses. Once the ML-NAV value becomes to "0," this channel assessment can return to normal.

A ML device may use the physical CCA mechanism on STR-constraint links combining with virtual carrier sensing to determine the channel availability.

A ML virtual carrier sensing may rely on the ML network allocation vector (ML-NAV) to assess the channel availability. A ML device may include multiple STR-constraint links, each of which has a CCA for the physical clear channel assessment. When a CCA of a link detects a preamble on its operating channel, it can set the ML-NAV associated to this channel to the occupancy with the period indicated by the duration field of received packet plus SIFS time. The type of ML-NAV can depend on whether the STR-constraint link of ML device is transmitting or receiving a frame.

If the CCA on a STR-constraint link detects the preamble of the transmission leaking from other channel of this ML device, the ML device can set ML-NAV (TX) associated to that channel occupied for the period indicated by the duration field of leaking transmission plus SIFS time. Another possible way to set ML-NAV (TX) is that the STR-constraint link of ML device can directly mark ML-NAV (TX) on the channel as occupied for the transmit period which the STR-constraint link of ML device is going to transmit. Therefore, once the ML device is transmitting a frame on a STR-constraint link, other enabled STR-constraint links of this ML device can be restricted by ML-NAV (TX) for adjustable ML-CCA.

If a ML device is receiving a frame on a STR-constraint link, it can set the ML-NAV (RX) for the period indicated by the duration field of the received frame plus SIFS time.

An adjustable ML-CCA may support various back off procedures. For instance, an independent back off procedure can be used for adjustable ML-CCA. For an independent back off of adjustable ML-CCA, each link can have its own CCA for channel availability assessment and its own set of back off counters. Each back off counter can correspond to an access category, such as Background (AC_BK), Best Effort (AC_BE), Video (AC_VI) or Voice (AC_VO). When the channel is sensed as idle by its CCA, the backoff counters of this link can decrease by "1".

As another example, a joint back off procedure can be used for adjustable ML-CCA. In the joint back off procedure of ML-CCA, each link can have its own CCA for clear channel assessment but shares one set of back off counters, i.e. a joint back off. Each back off counter corresponds to an access category, such as AC_BK, AC_BE, AC_VI or AC_VO, but the back off counter can jointly decrease when the adjustable ML-CCA sense multiple channels in idle. Therefore it would allow the ML device to access to the media more quickly than independent back off procedure.

A STR-constraint link of ML device may choose an adjustable ML-CCA with independent back off procedure or an adjustable ML-CCA with joint back off procedure for channel assessment and access.

Figure 3A:
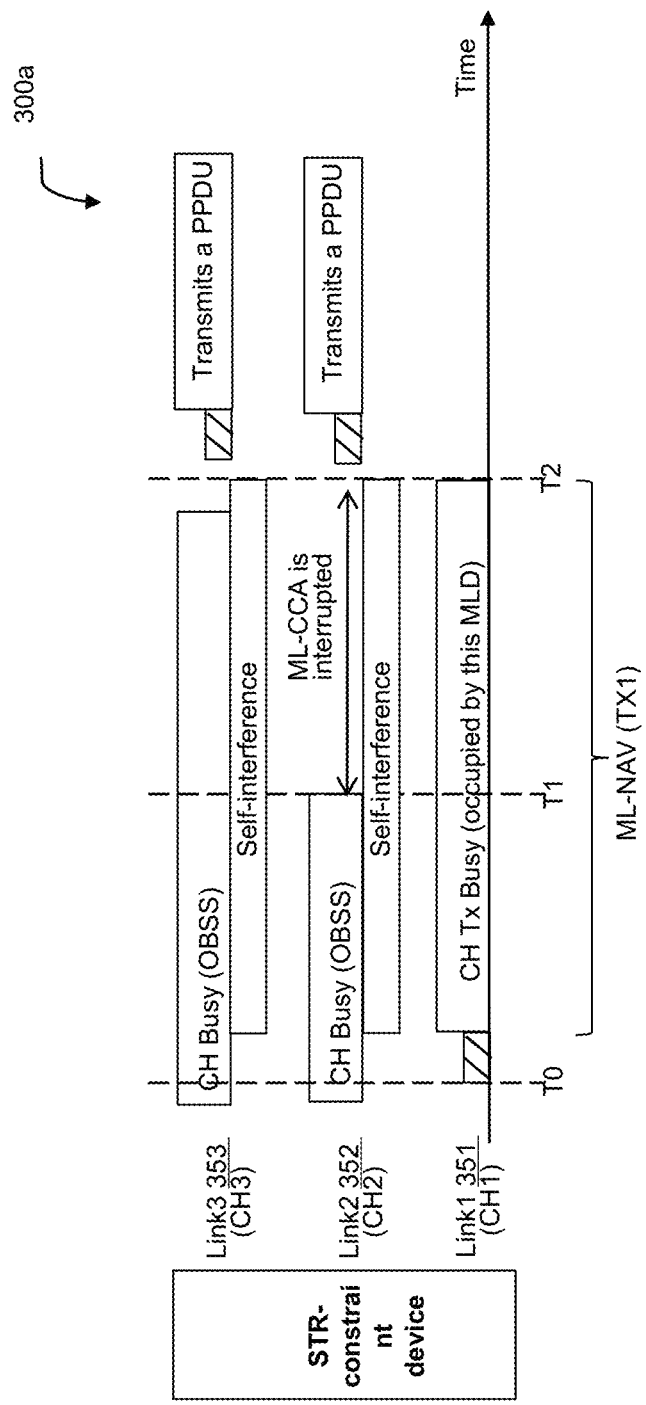
FIG. 3A illustrates an example multi-link network allocation vector setup procedure of the transmission in the simultaneous transmission and reception constraint operation without clear channel assessment adjustment.
Figure 3B:
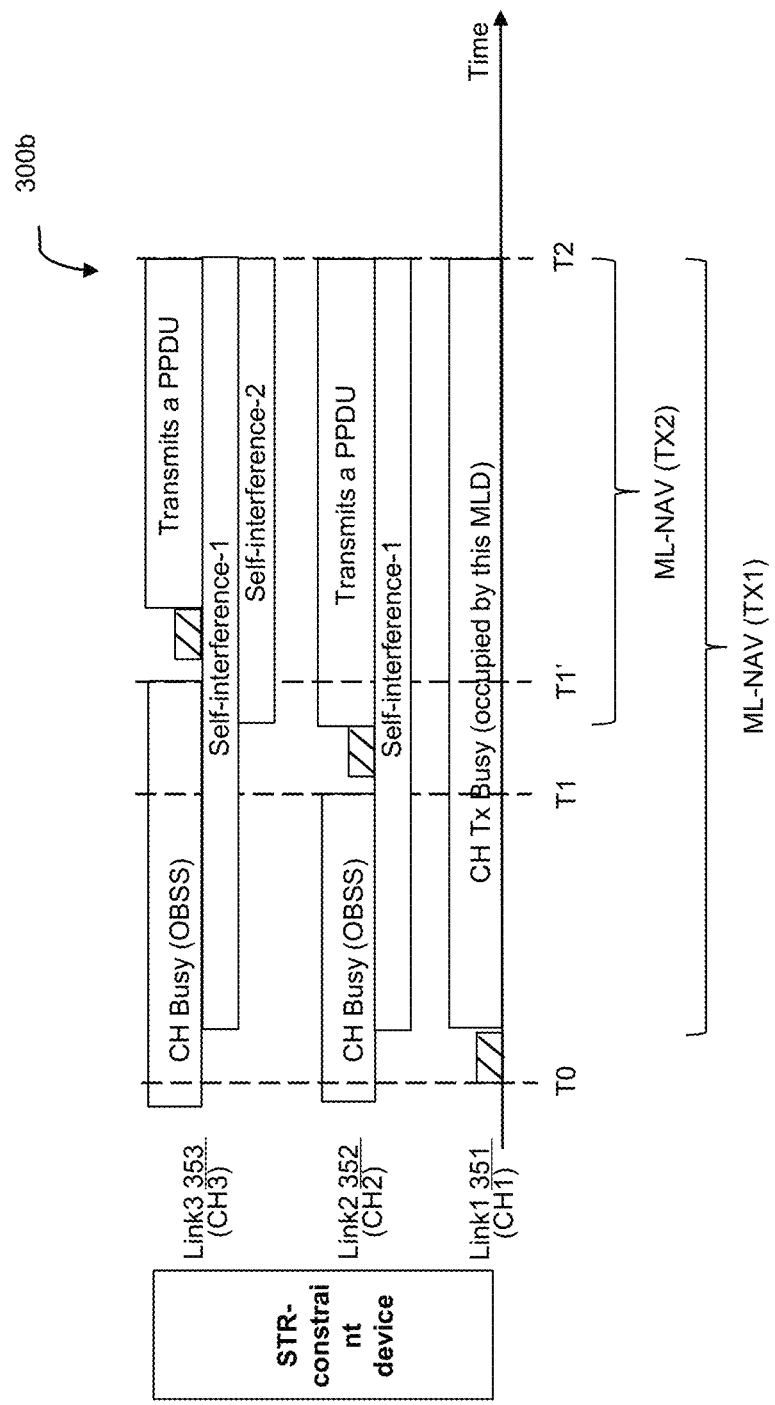
FIG. 3B illustrates an example multi-link network allocation vector setup procedure of the transmission in the simultaneous transmission and reception constraint operation with adjustable clear channel assessment.
Figure 3C:
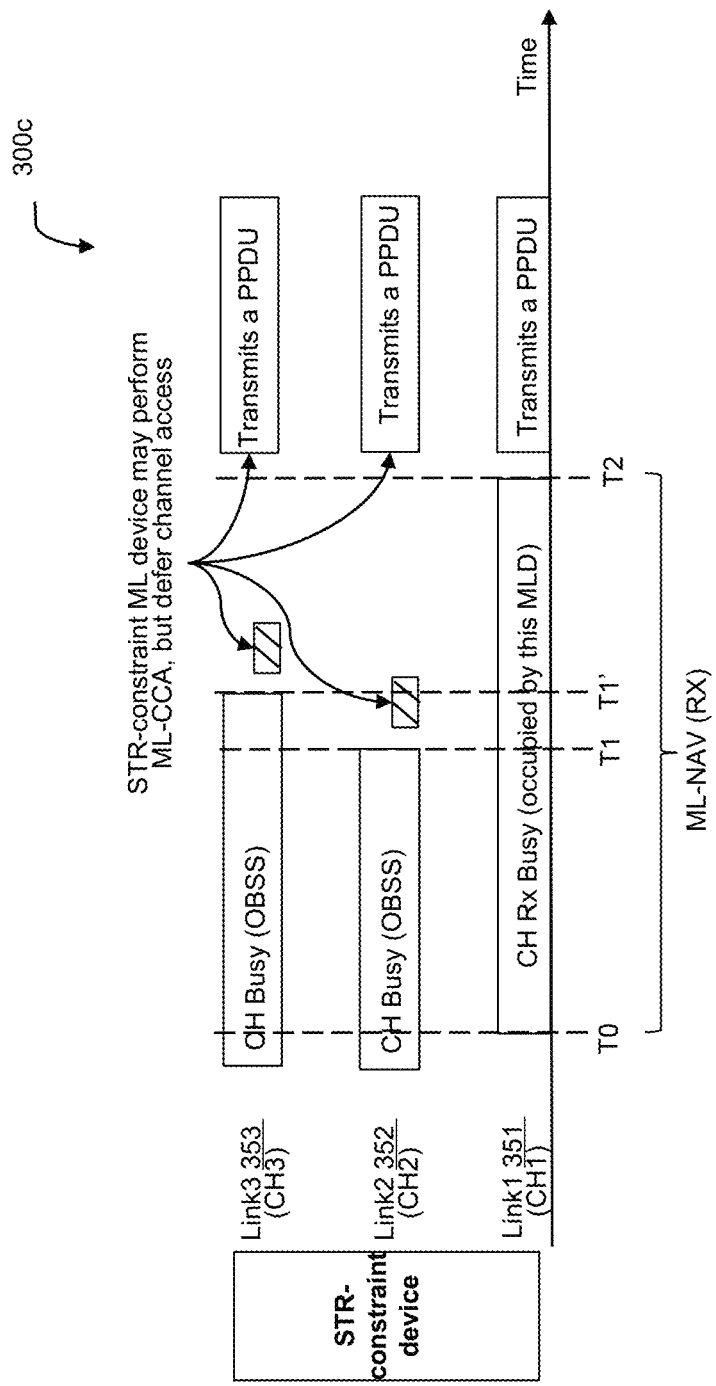
FIG. 3C illustrates an example multi-link network allocation vector setup procedure of the reception in the simultaneous transmission and reception operation constraint with deferred channel access.

FIGS. 3A-3C illustrate example procedures for adjustable ML-CCA of STR-constraint ML operation, using independent back off procedure on each link or a joint back off procedure with or without CCA adjustment. In embodiments of FIGS. 3A-3C, a STR-constraint ML device may consist of three radios which operate on a radio channel 1 (CH1), a radio channel 2 (CH2) and a radio channel 3 (CH3) respectively to establish STR-constraint operation over corresponding communication link1 351, link2 352, and link3 353.

A ML device may include multiple independent adjustable ML-CCA sensors on STR-constraint links, each of which can be associated to a STR-constraint link and can ether have an independent back off counters or share the joint back off counters. The adjustable ML-CCA can use the same set of EDCA parameters (like CW, CWmin, CWmax, etc.) corresponding to the ACs.

In the first embodiment, as shown in FIG. 3A, it illustrates the adjustable ML-CCA procedure of STR-constraint ML operation without channel assessment adjustment.

A ML device can receive from an application a MSDU pending in a queue at the time T0 and starts the adjustable ML-CCA on the enabled STR-constraint links (i.e. link1 351, link 2 352 and link3 353). As channels CH2 and CH3, in this example, are occupied by OBSS at the time T0 according to their NAV values, the STR-constraint link1 351 of ML device can start the adjustable ML-CCA on CH1 which NAV value is "0" and defers the adjustable ML-CCA on other links until their NAVs become "0." If the adjustable ML-CCA of the link1 351 detects its channel (e.g. CH1) in idle, the adjustable ML-CCA backoff counters corresponding to ACs can be reduced by "1." If none of back off counter reaches to "0," the adjustable ML-CCA process can continue on the corresponding link (e.g. link1) until at least one of the adjustable ML-CCA back off counters reaches to "0." Once one of the adjustable ML-CCA backoff counters reaches to "0" and the channel (e.g. CH1) link is still sensed as idle, the STR-constraint link1 351 of ML device can start to acquire the TXOP on the channel (e.g., CH1) via transmitting a frame, such as a control frame, a management frame, or a data frame.

Meanwhile, when a ML device that is going to transmit a frame on the STR-constraint link1 351 can set the ML-NAV (TX1) for other enabled link(s) (e.g. link2 352 and link3 353) to the duration of PPDU to be transmitted plus SIFS time. If this ML device does not support the adjustment of the adjustable ML-CCA on STR-constraint links, the adjustment on STR-constraint link2 352 and link3 353 can be disabled, as shown in this example. However, the CCA on those links may obtain an incorrect measurement or be interrupted.

After the ML device is transmitting a frame on CH1, the adjustable ML-CCAs on STR-constraint link2 and link3 may detect the preamble of transmission leading from CH1 and set ML-NAV (TX1) accordingly if the ML-NAV (TX1) has not been set by the STR-constraint MLD yet.

When NAV on CH2 becomes "0" at T1, the adjustable ML-CCA on link2 352 may start the physical channel assessment on CH2 without any adjustment. The disabled adjustable ML-CCA on link2 352 may not be able to get a clear channel assessment result on CH2 due to the self-interference leaking from the transmission on CH1. Therefore, disabled adjustable ML-CCA of link2 352 may not perform the back off procedure, even there is no other transmission on CH2 at T1. After the ML device completes its transmission on the STR-constraint link1 351 at the end of ML-NAV (TX1), the adjustable ML-CCA on link2 352 can be back to normal and starts its back off procedure.

If the adjustable ML-CCA on link2 352 detects its channel (e.g. CH2) in idle after the ML-NAV (TX1) ends, the adjustable ML-CCA back off counters corresponding to ACs can be reduced. If none of back off counters reaches to "0," the adjustable ML-CCA process can continue on the corresponding links (e.g., CH2 and CH3) until at least one of the adjustable ML-CCA back off counters reaches to "0." If one adjustable ML-CCA back off counter reaches to "0" and the channels (e.g., CH2 and CH3) are still sensed as idle, the device may start to acquire those channels (e.g., CH2 and CH3) via transmitting a frame, such as control frame, a management frame, or a data frame on the corresponding STR-constraint links.

In the second embodiment, as shown in FIG. 3B, it illustrates the adjustable ML-CCA procedure of STR-constraint ML operation. A ML device can receive an indication from an application a MSDU pending in a queue at the time T0 and starts the adjustable ML-CCA on the enabled STR-constraint links (i.e. link1 351, link2 352, and link3 353). As channels CH2 and CH3, in this example, are occupied OBSS at the time T0 according to their NAV values, the STR-constraint ML device can start the adjustable ML-CCA process on CH1 which NAV value is "0" and defer the adjustable ML-CCA on other links until their NAVs become "0." If the adjustable ML-CCA of the link1 351 detects its channel (e.g. CH1) in idle, the adjustable ML-CCA backoff counters corresponding to ACs can be reduced. If none of back off counter reaches to "0," the adjustable ML-CCA process can continue on the corresponding link (e.g., link1) until at least one of adjustable ML-CCA back off counters reaches "0." Once one of adjustable ML-CCA backoff counters reaches to "0" and the channel (e.g. CH1) is still sensed as idle, the ML device can start to acquire the channel (e.g., CH1) via transmitting a frame, such as a control frame, a management frame or a data frame on corresponding STR-constraint link.

Meanwhile, when the ML device that is going to transmit a frame on a STR-constraint link, it can set the ML-NAV (TX1) for other enabled non-transmitting links (e.g. link2 352 and link3 353) to the duration of PPDU to be transmitted plus SIFS time.

After the ML device is transmitting a frame on CH1, the adjustable ML-CCAs on STR-constraint link2 and link3 may detect the preamble of transmission leading from CH1 and set ML-NAV (TX1) accordingly if the ML-NAV (TX1) has not been set by the STR-constraint ML device yet.

The adjustment for the adjustable ML-CCA may be performed in any of the following methods. A first method can include the ML device directly informing the amount of adjustment according the setting and calibration to the adjustable ML-CCA on other STR-constraint links via the internal communication connections such as shared memory or bus. The self-interference strength can be calibrated in the external noise-free environment via measuring the received signal strength on every STR-constraint link when transmitting on another STR-constraint link for various transmit power level and generating the self-interference measurement matrix on each STR-constraint link to another STR-constraint link at various transmit power level.

A second method can include an adjustable ML-CCA on a link (e.g., link2 352 or link3 353) measuring the live self-interference from another channel (e.g., CH1) starting at the ML-NAV (TX1) and adjusts the total measurement result or EDT.

As shown in this example, the adjustable ML-CCA on link2 352 and/or link3 353 can measure the self-interference from CH1 when the ML-NAV (TX1) is set and adjust the adjustable ML-CCA in ether the measurement result or EDT.

For the option of the adjustable ML-CCA measurement mechanism, it can deduct the measurement result of self-interference of CH1 from its total adjustable ML-CCA measurement result. For the option of adjusted ML-CCA ED threshold, it can compensate the signal strength of self-interference of CH1 on the EDT, where the self-interference signal strength is ether informed by the ML device or live-measured by the adjustable ML-CCA of STR-constraint link2 352 or link3 353 when the ML-NAV(TX1) is set.

When the NAV on CH2 becomes "0" at T1, the adjustable ML-CCA on link2 352 can start physical channel assessment on CH2 with the adjustment. If the adjustable ML-CCA on link2 352 detects its channel (e.g. CH2) in idle, the adjustable ML-CCA can trigger the back off process to reduce the back off counters. If none of back off counters reaches to "0" on link2, the adjustable ML-CCA process can continue on CH2 until at least one of the adjustable ML-CCA back off counters reaches to "0." If one of the adjustable ML-CCA back off counters on link 2 reaches to "0" and the channel (e.g. CH2) is still sensed as idle, the ML device can start transmitting a frame on STR-constraint link2 352 during the ML-NAV (TX1). The transmission on link2 352 can be aligned at the end of transmission on link1 351.

Meanwhile, when a ML device that is going to transmit a frame on a STR-constraint link (e.g. link2 352), it can set the ML-NAV (TX2) for other enabled non-transmitting STR-constraint link(s) (e.g. link3 353) to the duration of PPDU to be transmitted plus SIFS time.

Similarly, after the ML device is transmitting a frame on CH2, the adjustable ML-CCA on STR-constraint link3 may detect the preamble of transmission leading from CH2 and set ML-NAV (TX2) accordingly if the ML-NAV (TX2) has not been set by the STR-constraint MLD yet.

As shown in this example, the adjustable ML-CCA on link3 353 measures the self-interference from CH2 once ML-NAV (TX2) is set, in addition to the measurement of self-interference from CH1 after ML-NAV (TX1) is set. The adjustable ML-CCA on STR-constraint link3 can adjust its CCA with either the informed self-interference signal strength by the ML device or the measured self-interference by itself when the ML-NAV(TX2) is set for the transmission.

For the option of the adjusted channel measurement of adjustable ML-CCA mechanism, it can deduct the signal strength of self-interference of CH1 from its total adjustable ML-CCA measurement result when the ML-NAV (TX1) is set, and deduct the signal strength of self-interference from CH2 in its total adjustable ML-CCA measurement result when the ML-NAV (TX2) is set.

For the option of the adjustment of ED threshold of adjustable ML-CCA mechanism, it can compensate the EDT with the signal strength of self-interference of CH1 when the ML-NAV (TX1) is set and compensate the EDT with the signal strength of self-interference of CH2 when ML-NAV (TX2) is set.

When the NAV on CH3 becomes "0" at time T1', the adjustable ML-CCA on link3 353 can start the adjustable ML-CCA on CH3. If the adjustable ML-CCA on link3 353 detects CH3 idle, the adjustable ML-CCA can trigger the back off procedure to decrease the back off counters on link3 353. If none of back off counters reaches to "0," the adjustable ML-CCA process can continue on CH3 until at least one of the adjustable ML-CCA back off counters reaches to "0." If one of the adjustable ML-CCA back off counters on link3 353 reaches to "0" and the channel (e.g. CH3) is still sensed as idle, the ML device can start transmitting a frame on STR-constraint link3 353. The ending time of the transmission on link3 353 may align with both ML-NAV (TX1) and ML-NAV (TX2).

In the third embodiment, as shown in FIG. 3C, it can illustrate the adjustable ML-CCA procedure of STR-constraint links of ML device with deferred channel access.

A ML device can receive a frame on STR-constraint link1 351 from the associated AP ML device at the time T0. Meanwhile, it can detect the CH2 and CH3 are occupied by OBSS according to their NAV values. The ML device can set ML-NAV (RX1) for the enabled STR-constraint link2 352 and link3 353 to the duration of received PPDU on link1 351 plus SIFS time.

After the time T0, the ML device can receive from an application a MSDU pending in a queue and intends to start the adjustable ML-CCA on the enabled STR-constraint links. Since it is receiving a frame on link1 351, it may start the adjustable ML-CCA on other links, i.e. link2 352 and link3 353. However, as NAVs of both link2 352 and link3 352 are set from OBSS transmission and not reduced to "0" yet, the adjustable ML-CCA may be postponed until at least one of NAV values is reduced to "0." At time T1, the NAV on link2 352 can become "0," therefore the adjustable ML-CCA on link2 352 can start without channel assessment adjustment.

If the adjustable ML-CCA of the link2 352 detects its channel (e.g. CH2) in idle, the adjustable ML-CCA can trigger the back off procedure to reduce the back off counters. If none of back off counters reaches to "0," the adjustable ML-CCA process can continue on the corresponding link (e.g., link2 352) until at least one of back off counters reaches to "0." Once one of the adjustable ML-CCA backoff counters reaches to "0" and the channel (e.g. CH2) is still sensed as idle, the ML device can check the ML-NAV setting on STR-constraint links. If the ML-NAV (RX1) is set and its value is not reduced to "0," the ML device can defer the channel access on STR-constraint link2 352 until the ML-NAV (RX1) value is reduced to "0." The ML device then can acquire the channel (e.g., CH2) via transmitting a frame, such as a control frame, a management frame, or a data frame.

Similarly, at time T1', the NAV on STR-constraint link3 353 can become "0," the adjustable ML-CCA can then start the CCA process on link3 353 without assessment adjustment.

If the adjustable ML-CCA of the link3 353 detects its channel (e.g. CH3) in idle, the adjustable ML-CCA can trigger the back off procedure to decrease the back off counters. If none of the back off counters reaches to "0," the adjustable ML-CCA process can continue on the corresponding channel (e.g., CH3) until at least one of the adjustable ML-CCA back off counters reaches to "0." Once one of the adjustable ML-CCA backoff counters reaches to "0" and the channel (e.g. CH3) is still sensed as idle, the ML device can check the ML-NAV setting on STR-constraint links. If the ML-NAV (RX1) is set and its value is not reduced to "0," the ML device can defer the channel access on STR-constraint link3 353 until the ML-NAV (RX1) value is reduced to "0." The STR-constraint ML device can then acquire the channel (e.g., CH3) via transmitting a frame, such as a control frame, a management frame, or data frame. Therefore, the ML device may transmit PPDUs on both STR-constraint link2 352 and link3 353 synchronously with the transmission on link1 351 after the ML-NAV(RX1) ends.

Figure 4A:
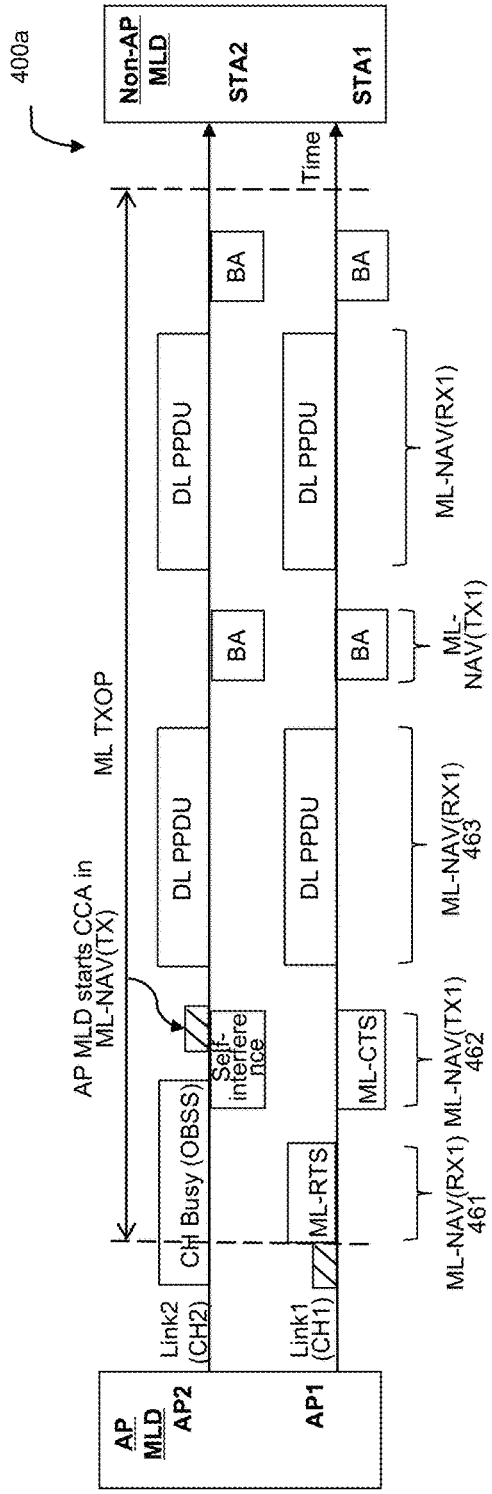
FIG. 4A illustrates an example signaling process of simultaneous transmission and reception multi-link access point initiated adjustable clear channel assessment during ML-NAV for transmission in the simultaneous transmission and reception constraint operation.
Figure 4B:
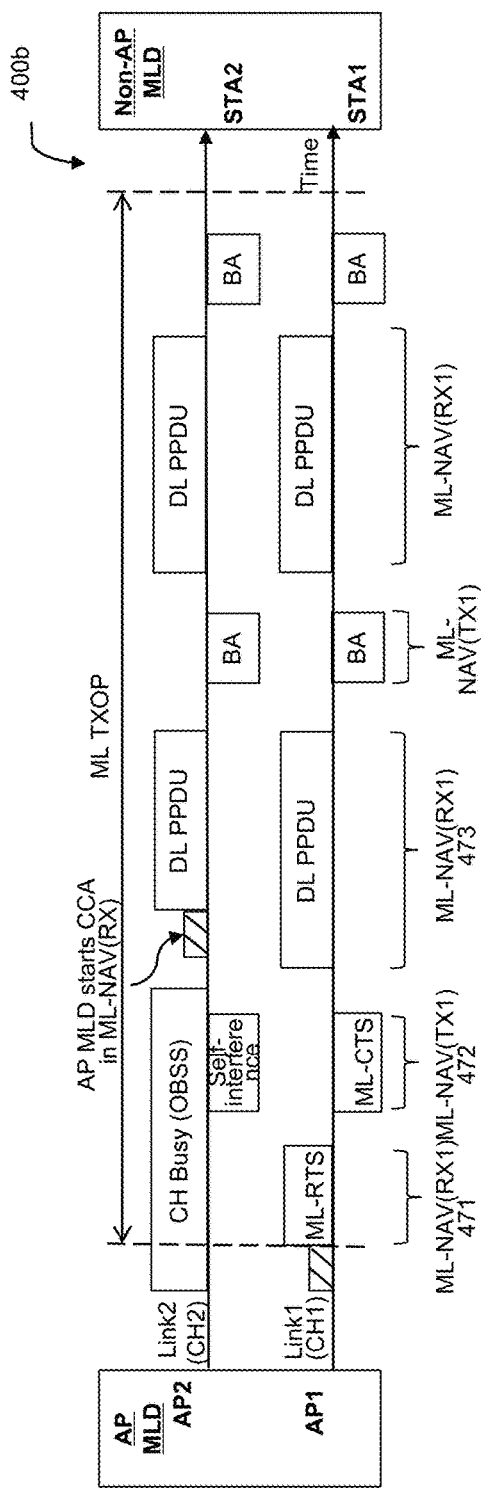
FIG. 4B illustrates an example signaling process of simultaneous transmission and reception multi-link access point initiated adjustable clear channel assessment during ML-NAV for reception in the simultaneous transmission and reception constraint operation.

FIGS. 4A-4B illustrate example procedures of AP ML device initiated adjustable ML-CCA for STR-constraint ML operation. Before an AP ML device establishes the ML communication with a non-AP ML device, they can exchange the ML capability information and setup an agreed ML operation mode. In such an instance, the AP ML device can be a STR capable ML device and the non-AP ML device is a STR-constraint capable ML device. Therefore, when the AP ML device is to communicate with the non-AP ML device, both of them can use the STR-constraint operation mode on link 1 and link 2. These procedures can be applicable to the case that both AP ML device and non-AP ML device are of STR-constraint links.

In embodiment as shown in FIG. 4A, it can illustrate an example STR AP ML device initiated CCA procedure during the ML-NAV being set for the transmission of STR-constraint ML operation. The STR AP ML device can start to transmit a ML-RTS to acquire the ML TXOP for DL transmission after performing CCA on the link1 as the CH2 is occupied by OBSS from the indication of NAV. The STR AP ML device may set ML-NAV for the STR-constraint operation with this non-AP ML device. When receiving the ML-RTS on link1, the STR-constraint non-AP ML device can set ML-NAV(RX1) 461 of STR-constraint ML operation. It then can respond with a ML-CTS on the same link and sets the ML-NAV(TX1) of STR-constraint operation. The STR AP ML device may set the ML-NAV(TX1) for the STR-constraint operation with this non-AP ML device as well.

Once the CH2 is released by OBSS, the STR AP ML device may start a CCA process to acquire the CH2 to setup additional transmission on link2. As the ML-NAV is set for transmission of STR-constraint operation, the STR AP ML device can complete the CCA process within the ML-NAV (TX1) period. If the CCA reports the CH2 is clear, the STR AP ML device may or may not synchronize the DL transmissions over link1 and link2 in the next ML-NAV(RX1) period. FIG. 4A can illustrate that the STR AP ML device synchronizes and transmits DL packets over link1 and link2 in the next ML-NAV period.

In embodiment as shown in FIG. 4B, it illustrates an example STR AP ML device initiated CCA procedure during the ML-NAV which is set for the reception of STR-constraint ML operation. The STR AP ML device can start to transmit a ML-RTS to acquire ML TXOP for DL transmission after performing CCA on the link1 when the CH2 is occupied by OBSS from the indication of NAV. The STR AP ML device then can set ML-NAV(RX1) for STR-constraint operation with this non-AP ML device. When receiving the ML-RTS on link1, the STR-constraint non-AP ML device can set ML-NAV(RX1). It then can respond with a ML-CTS on the same link and sets the ML-NAV(TX1) 472 of STR-constraint operation. The AP ML device may set the ML-NAV(TX1) for the STR-constraint operation with this STR-constraint non-AP ML device when receiving the ML-CTS as well.

As the CH2 is still occupied by OB SS when receiving the ML-CTS, the STR AP ML device can start DL transmission only on link1 and sets the ML-NAV(RX1) for STR-constraint operation with this non-AP ML device. The STR-constraint non-AP ML device receiving the DL transmission can set the ML-NAV(RX1) 471. After the DL transmission starts, the AP ML device can detect the CH2 is idle via the NAV indication. It can then start the CCA on the link2 within the period of ML-NAV(RX1) of STR-constraint operation. If the CCA on link2 declares the CH2 clear, the STR AP ML device can start to transmit another DL frame on link2. The DL transmission on link2 should be ended at the time of ML-NAV(RX1) completion.

In this way, the STR AP ML device is able to transmit different DL PPDUs over different STR-constraint links asynchronously to a non-AP ML device.

Figure 5C:
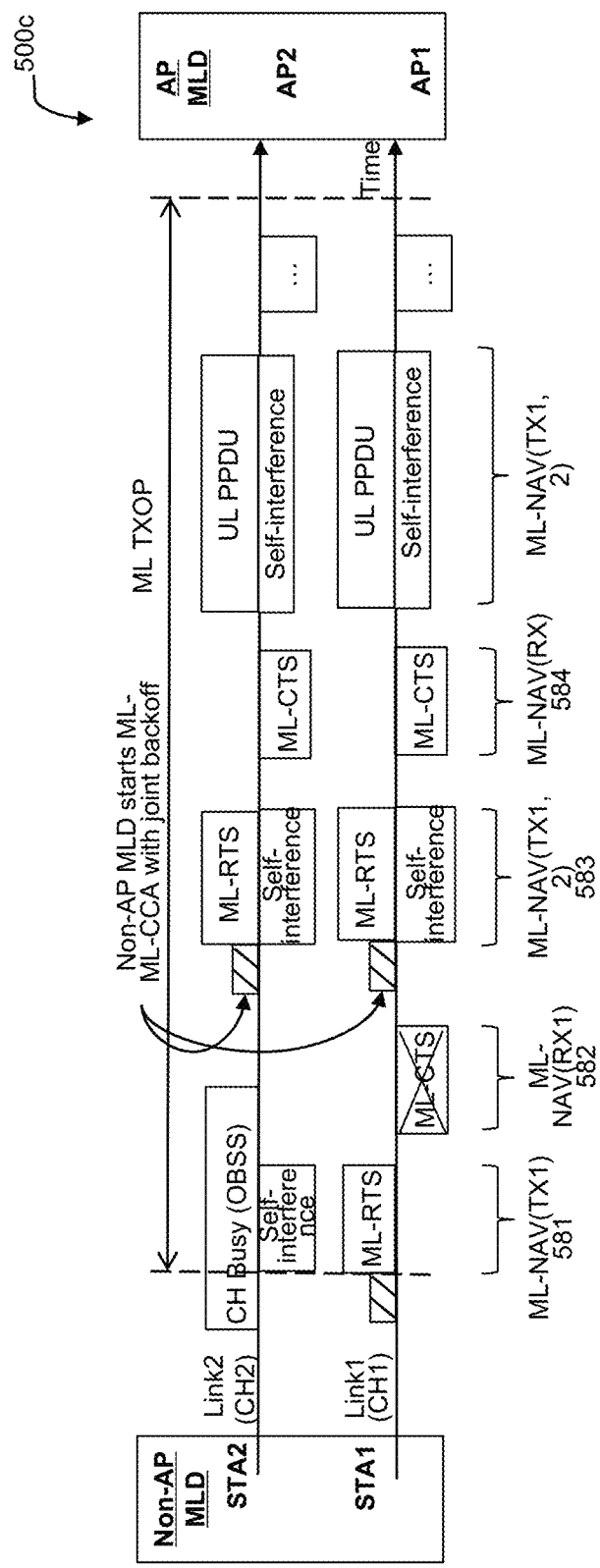
FIG. 5C illustrates an example signaling process of simultaneous transmission and reception constraint multi-link station initiated multi-link clear channel assessment with the joint back off mechanism for synchronous communication.

FIGS. 5A-5C illustrate example procedures of non-AP ML device initiated adjustable ML-CCA for STR-constraint ML operation. Before an AP ML device establishes the ML communication with a non-AP ML device, they can exchange the ML capability information and setup the agreed ML operation mode. In those examples, the AP ML device is a STR capable ML device and the non-AP ML device is a STR-constraint capable ML device. Therefore, when the AP ML device is to communicate with this non-AP ML device, both of them can use the STR-constraint operation mode. These procedures can be applicable to the case that both AP ML device and non-AP ML device are of STR-constraint links.

In embodiment as shown in FIG. 5A, it illustrates an example STR-constraint non-AP ML device initiated adjustable ML-CCA procedure during the ML-NAV being set for the reception of STR-constraint ML operation. The non-AP ML device can start to transmit a ML-RTS to acquire ML TXOP for UL transmission after performing adjustable ML-CCA on the STR-constraint link1 when the CH2 is occupied by OBSS indicated in NAV. The non-AP ML device can set the ML-NAV(TX1) for the STR-constraint operation. When receiving the ML-RTS on link1, the STR AP ML device may set the ML-NAV(RX1) for the STR-constraint operation with this non-AP ML device. It then can respond with a ML-CTS on the same link and sets the ML-NAV(RX1) for the STR-constraint operation with this non-AP ML device The non-AP ML device can set the ML-NAV(RX1) for the STR-constraint operation after receiving the ML-CTS.

At this time, the CH2 can be released by OBSS. The non-AP ML device may start adjustable ML-CCA process on STR-constraint link2 to acquire the CH2 to setup additional UL transmission. As the ML-NAV can be set for reception of STR-constraint operation, the non-AP ML device can complete adjustable ML-CCA process within the ML-NAV(RX1) 572 period. If the adjustable ML-CCA reports the CH2 is clear, the non-AP ML device may or may not synchronize the UL transmissions over STR-constraint link1 and link2 in the next ML-NAV(TX1) 571 period. FIG. 5A can illustrate the STR-constraint non-AP ML device synchronizing and transmitting UL packets over link1 and link2 in the next ML-NAV period.

In the embodiment as shown in FIG. 5B, it illustrates an example non-AP ML device initiated adjustable ML-CCA procedure during the ML-NAV being set for the transmission of STR-constraint ML operation. The non-AP ML device starts to transmit a ML-RTS on STR-constraint link1 to acquire ML TXOP for UL transmission after performing adjustable ML-CCA on the link1 when the CH2 is occupied by OBSS indicated by the NAV. The non-AP ML device sets ML-NAV(TX1) for the STR-constraint operation. After receiving the ML-RTS on STR-constraint link1, the STR AP ML device may set the ML-NAV(TX1) for the STR-constraint operation with this non-AP ML device. It then responds with a ML-CTS on the same link and sets ML-NAV(RX1) for the STR-constraint operation with this non-AP ML device. The non-AP ML device can set the ML-NAV (RX1) of the STR-constraint operation when receiving the ML-CTS.

If the CH2 is still occupied by OBSS when transmitting the ML-CTS, the non-AP ML device can start UL transmission on STR-constraint link1 only and sets the ML-NAV (TX1) of STR-constraint operation. The STR AP ML device receiving the UL transmission may set the ML-NAV(TX1) for the STR-constraint operation with this non-AP ML device.

After the UL transmission starts, the non-AP ML device detects the CH2 is idle from NAV indication, it then can start the adjustable ML-CCA on STR-constraint link2 within the period of ML-NAV(TX1) of STR-constraint operation. If the adjustable ML-CCA on link2 declares the CH2 clear, the non-AP ML device can start another UL transmission on STR-constraint link2. The UL transmission can be ended at the time of ML-NAV(TX1) completion.

In the embodiment as shown in FIG. 5C, it illustrates an example non-AP ML device-initiated ML-CCA procedure with the joint back off mechanism. The non-AP ML device can start to transmit a ML-RTS on STR-constraint link1 to acquire ML TXOP for UL transmission after performing adjustable ML-CCA on the link1 when the CH2 is occupied by OBSS indicated by the NAV. The non-AP ML device can set ML-NAV(TX1) for the STR-constraint operation. After receiving the ML-RTS on STR-constraint link1, the AP ML device may set the ML-NAV(TX1) for the STR-constraint operation with this non-AP ML device. It then responds with a ML-CTS on the same link and sets ML-NAV(RX1) for the STR-constraint operation with this non-AP ML device. However, the ML-CTS message is not received by the non-AP ML device on the STR-constraint lin1. Therefore, the non-AP ML device may have to contend the media again.

ML-CCAs of the non-AP ML device can detect both STR-constraint link1 and link2 independently. As both channels are sensed as idle, the joint back off counters may be reduced for both STR-constraint links. The ML-CCAs can continue the same process until at least one of the joint back off counters reaches to "0." Once a joint back off counter reaches to "0," the non-AP ML device can transmit a ML-RTS on the clear STR-constraint links, i.e. link1 and link2, and set the ML-NAV(TX1) and ML-NAV(TX2) for the STR-constraint operation.

After receiving the ML-RTS on both STR-constraint links, the AP ML device may set the ML-NAV(TX1) and ML-NAV(TX2) for the STR-constraint operation with this non-AP ML device as well. It then can respond with a ML-CTS on both links and sets ML-NAV(RX1) and ML-NAV(RX2) for the STR-constraint operation with this non-AP ML device. The non-AP ML device can set the ML-NAV (RX1) and ML-NAV(RX2) for the STR-constraint operation when receiving the ML-CTS on the STR-constraint links.

In this way, the non-AP ML device may transmit different UL PPDUs over different STR-constraint links asynchronously or synchronous to a STR AP ML device.

Figure 6:
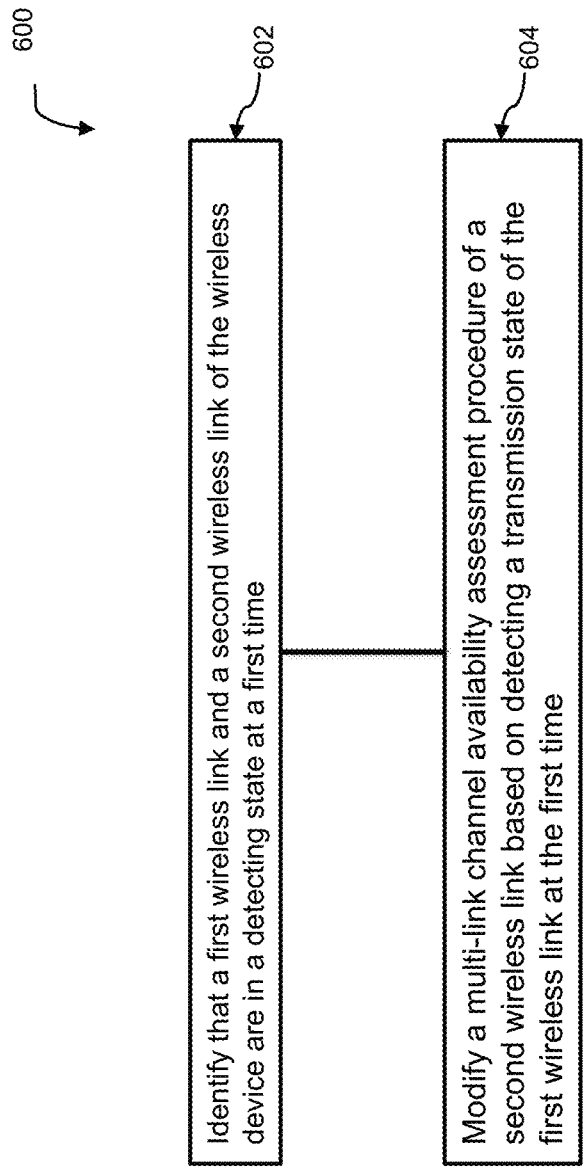
FIG. 6 is a block diagram of a method to establishing a multi-link network allocation vector for transmission and/or reception and an adjustable clear channel assessment mechanism.

FIG. 6 is a block diagram of a method to establishing a multi-link network allocation vector for transmission and/or reception and an adjustable clear channel assessment mechanism. The method can include identifying, by a wireless device, that a first wireless link and a second wireless link of the wireless device are in a detecting state at a first time (block 602).

The detecting state can be indicative of a wireless link actively performing a task, such as transmitting data, receiving data, or listening if the wireless channel is busy with other data transmissions, etc. A wireless link can include operating on any of a channel of an AP MLD or a station of a non-AP MLD, for example.

The method can also include modifying, by the wireless device, a multi-link channel availability assessment procedure of a second wireless link based on detecting a transmission state of the first wireless link at the first time (block 604). Detecting the transmission state of a wireless link can include identifying whether the wireless link is in transmission state. If a wireless link is in the detecting state, the multi-link channel availability assessment procedure can be modified based on the determination on that the wireless link.

In some embodiments, the wireless device is an access point (AP) multi-link device (MLD) capable of performing in a simultaneous transmission and reception constraint (STR-constraint) operation.

In some embodiments, the method includes determining, by the wireless device, that the first wireless link is in the transmission state at a second time, wherein modifying the multi-link channel availability assessment procedure includes deferring initiation of the multi-link channel availability assessment procedure for the second wireless link to a third time.

In some embodiments, detecting that the first wireless link is in the transmission state includes determining that a network allocation vector (NAV) value for the first wireless link wireless link of the wireless device does not equal to zero.

In some embodiments, the method includes determining, by the wireless device, that a first multi-link NAV transmission period has expired; initiating, by the wireless device, the multi-link channel availability assessment procedure and a back off procedure for the second wireless link at a time corresponding to the expiration of the first multi-link NAV transmission period; and transmitting, by the wireless device, a first message over the second wireless link responsive to detecting an expiration of the back off counter.

In another example embodiment, a method for wireless communication comprises identifying, by a wireless device, that a first wireless link and a second wireless link of the wireless device are in a detecting state at a first time; and responsive to detecting that the first wireless link is in a transmission state at the first time, adjusting, by the wireless device, a multi-link channel availability assessment procedure for the second wireless link based on the transmission state of the first wireless link and initiating the multi-link channel availability assessment procedure for the second wireless link.

In some embodiments, the method includes responsive to detecting that first wireless link and the second wireless link are in a transmission state at a second time, adjusting, by the wireless device, a multi-link channel availability assessment procedure for a third wireless link based on the transmission state of the first wireless link and the second wireless link.

In some embodiments, the method includes detecting, by the wireless device, that the third wireless link is in a detecting state at the third time via a multi-link channel availability assessment procedure for the third wireless link.

In some embodiments, the method includes establishing, by the wireless device, a first multi-link NAV transmission period at the first time, wherein initiation of the multi-link channel availability assessment procedure for the second wireless link and a third wireless link is based on first multi-link NAV transmission period.

In some embodiments, the method includes establishing, by the wireless device, a second multi-link NAV transmission period at the second time, wherein initiation of the multi-link channel availability assessment procedure for a third wireless link is based on the first multi-link NAV transmission period and the second multi-link NAV transmission period.

In some embodiments, the multi-link channel availability assessment procedure for any wireless link of the wireless device includes a modified received signal strength measurement based on a measured received signal strength resulting from transmission of other messages on a first channel.

In some embodiments, the multi-link channel availability assessment procedure includes transmitting a first message on the second wireless link responsive to a back off counter reaching zero.

In some embodiments, the modified received signal strength is indicated by the wireless device.

In some embodiments, the method includes generating, by the wireless device, an interference measurement matrix that includes the measured signal strengths of each transmitting wireless link of the wireless device.

In some embodiments, the method includes deriving, by the wireless device, the measured signal transmission strength of each wireless link of the wireless device;

In some embodiments, the method includes deriving, by the wireless device, a modified received signal strength in the multi-link channel availability assessment procedure on any wireless link based on the interference measurement matrix.

In some embodiments, the method includes modifying, by the wireless device, an energy detection threshold (EDT) of a wireless link based on the interference measurement matrix.

In some embodiments, the method includes transmitting, by the wireless device, a first downlink message on the first wireless link and a second downlink message on the second wireless link simultaneously responsive to completion of the multi-link channel availability assessment procedure.

In some embodiments, the method includes transmitting, by the wireless device, a first uplink message on the first wireless link and a second uplink message on the second wireless link separately responsive to completion of the multi-link channel availability assessment procedure.

In some embodiments, the method includes transmitting, by the wireless device, a first uplink message on the first wireless link and a second uplink message on the second wireless link simultaneously responsive to completion of the multi-link channel availability assessment procedure.

In some embodiments, the method includes transmitting, by the wireless device, a first uplink message on the first wireless link and a second uplink message on the second wireless link simultaneously responsive to completion of the multi-link channel availability assessment procedure that includes a joint back off procedure for both the first wireless link and the second wireless link.

In another example embodiment, a method for wireless communication comprises identifying, by a wireless device, that a first wireless link is receiving data and a second wireless link of the wireless device is in a detecting state at a first time; and responsive to detecting that the second wireless link is in a detecting state at a second time, modifying, by the wireless device, initiation of a multi-link channel availability assessment procedure for the second wireless link.

In some embodiments, modifying initiation of the multi-link channel availability assessment procedure for the second wireless link includes initiating a back off procedure for the second wireless link at the second time.

In some embodiments, the method includes deferring, by the wireless device, initiation of channel access and transmission of a first message on the second wireless link until completion of the reception of data at the first wireless link.

In some embodiments, the method includes determining, by the wireless device, that the first wireless link has completed the reception of data based on detecting that a NAV value of the first wireless link equals zero.

In some embodiments, the method includes initiating, by the wireless device, a second back off procedure for the third wireless link at the second time; and transmitting, by the wireless device, a first message at the second wireless link and a second message at the third wireless link simultaneously responsive to detection of a completion of a first NAV transmission period.

In another example embodiment, a method for wireless communication comprises initiating, by a wireless device, a multi-link network reception period at a first time, wherein a first wireless link receives data during the multi-link network allocation vector reception period and a second wireless link is in a detecting state at the first time; initiating, by the wireless device, a multi-link NAV transmission period at a second time, wherein the first wireless link sends data during the multi-link network transmission period and the second wireless link is in a detecting state at the second time; and adjusting, by the wireless device, a multi-link channel availability assessment procedure for the second wireless link responsive to detecting that the second wireless link is in the detecting state at the second time.

In some embodiments, adjusting the channel availability assessment procedure for the second wireless link includes initiating a back off procedure for the second wireless link at the second time that the second wireless channel is sensed as idle.

In some embodiments, the method includes receiving, by the wireless device, a downlink message on each of the first wireless link and the second wireless link simultaneously at a third time responsive to completion of the multi-link channel availability assessment procedure for the second wireless link.

In another example embodiment, a method for wireless communication comprises initiating, by a wireless device, a first multi-link network reception period at a first time, wherein a first wireless link receives a first set of data during the first multi-link network reception period and a second wireless link is in a detecting state at the first time; initiating, by the wireless device, a multi-link network transmission period at a second time, wherein the first wireless link sends data during the multi-link network transmission period and the second wireless link is in the active state at the second time; initiating, by the wireless device, a second multi-link network reception period at a third time, wherein the first wireless link receives a second set of data during the second multi-link network reception period and the second wireless link is in an detecting state at the third time; and adjusting, by the wireless device, a multi-link channel availability assessment procedure for the second wireless link responsive to detecting that the second wireless link is in the detecting state at the third time.

In some embodiments, adjusting the channel availability assessment procedure for the second wireless link includes initiating the channel availability assessment procedure for the second wireless link at the third time.

In another example embodiment, a method for wireless communication comprises initiating, by a multi-link station, a first multi-link network transmission period at a first time, wherein a first wireless link transmits a first set of data during the first multi-link network transmission period and a second wireless link is in a detecting state during the first multi-link network transmission period; initiating, by the multi-link station, a multi-link network reception period at a second time, wherein the first wireless link receives data during the multi-link network reception period and the second wireless link is in a detecting state during the multi-link network reception period; and adjusting, by the multi-link station, a multi-link channel availability assessment procedure for the second wireless link to detect that the second wireless channel transitions into the idle state during the multi-link network reception period.

In some embodiments, the wireless device is a device capable of performing in a simultaneous transmission and reception constraint operation.

In some embodiments, adjusting the channel availability assessment procedure for the second wireless link includes initiating a back off counter for the second wireless link during the multi-link network reception period.

In some embodiments, the method includes transmitting, by the wireless device, an uplink message on each of the first wireless link and the second wireless link simultaneously at a third time during a second multi-link network transmission period, wherein transmission of the uplink messages is performed responsive to completion of the multi-link channel availability assessment procedure for the second wireless link.

In another example embodiment, a method for wireless communication comprises initiating, by a wireless device, a first multi-link network transmission period at a first time, wherein a first wireless link transmits a first set of data during the first multi-link network transmission period and a second wireless link is in a detecting state during the first multi-link network transmission period; initiating, by the multi-link station, a multi-link network reception period at a second time, wherein the first wireless link receives data during the multi-link network reception period and the second wireless link is in the active state during the multi-link network reception period; initiating, by the multi-link station, a second multi-link network transmission period at a third time, wherein the first wireless link transmits a second set of data during the second multi-link network transmitting period and the second wireless link is in a detecting state prior to the third time; and adjusting, by the wireless device, a multi-link channel availability assessment procedure for the second wireless link to detect that the second wireless channel transitions into the idle state prior to the third time.

In some embodiments, adjusting the channel availability assessment procedure for the second wireless link includes: initiating, by the multi-link station, a back off procedure for the second wireless link at the third time; and responsive to expiry of the back off counter, transmitting, by the wireless device, a third set of data during the second multi-link network transmission period.

In another example embodiment, a method for wireless communication comprises initiating, by a wireless device, a first multi-link network transmission period at a first time, wherein a first wireless link transmits a first set of data during the first multi-link network transmission period and a second wireless link is in a detecting state during the first multi-link network transmission period; detecting, by the wireless device, that data was not received by the first wireless link during a multi-link network reception period at a second time, wherein the second wireless link is in a detecting state during the multi-link network reception period; adjusting, by the multi-link station, a multi-link channel availability assessment procedure for the first wireless link and the second wireless link responsive to detecting that the data was not received by the first wireless link during the multi-link network reception period at the second time.

In some embodiments, adjusting the multi-link channel availability assessment procedure for the first wireless link and the second wireless link includes initiating a joint back off procedure for the first wireless link and the second wireless link at a third time.

In some embodiments, adjusting the multi-link channel availability assessment procedure for the first wireless link and the second wireless link includes a result in transmitting a second set of data by the first wireless link during a second multi-link network transmission period and transmitting a third set of data by the second wireless link during the second multi-link network transmission period.

Example Wireless System

Figure 7:
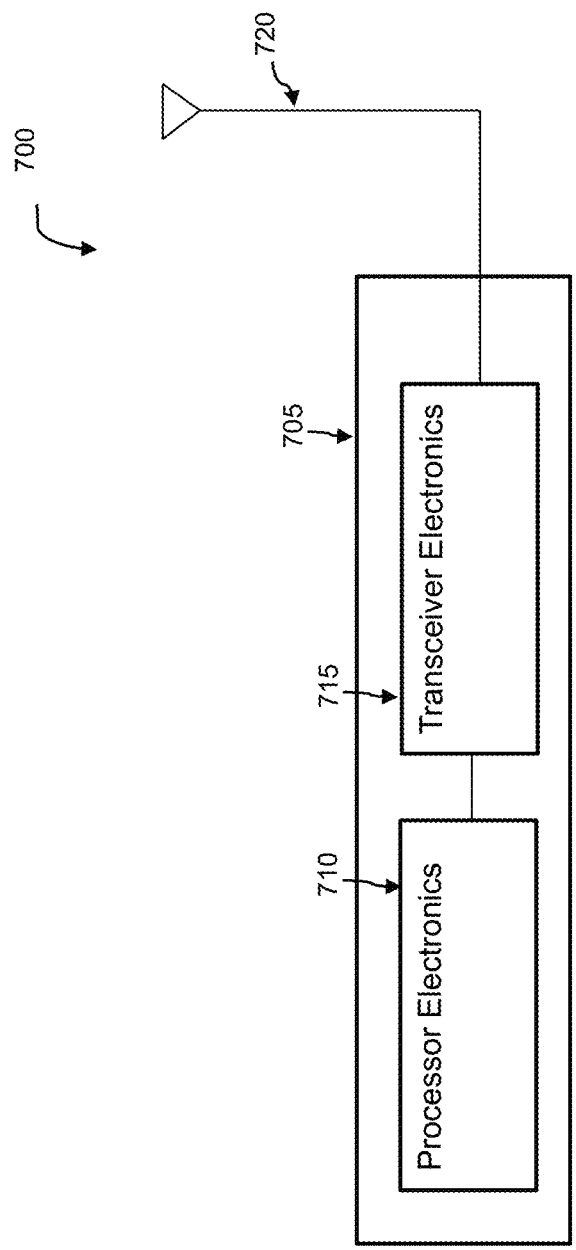
FIG. 7 is a block diagram representation of a portion of a hardware platform.

FIG. 7 is a block diagram representation of a portion of a hardware platform. A hardware platform 705 such as a network device or a base station or a wireless device (or UE) can include processor electronics 710 such as a microprocessor that implements one or more of the techniques presented in this document. The hardware platform 705 can include transceiver electronics 715 to send and/or receive wired or wireless signals over one or more communication interfaces such as antenna 720 or a wireline interface. The hardware platform 705 can implement other communication interfaces with defined protocols for transmitting and receiving data. The hardware platform 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the hardware platform 705.

CONCLUSION

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   identifying, by a wireless device, that a first wireless link of the wireless device and a second wireless link of the wireless device are in a busy state at a first time;
   responsive to detecting that the first wireless link is in a transmission state at the first time, adjusting, by the wireless device, a multi-link channel availability assessment procedure for the second wireless link based on the transmission state of the first wireless link and initiating the multi-link channel availability assessment procedure for the second wireless link; and
   establishing, by the wireless device, a first multi-link network allocation vector (NAV) transmission period at the first time, wherein initiation of the multi-link channel availability assessment procedure for the second wireless link and a third wireless link is based on the first multi-link NAV transmission period.

2. The method of claim 1, further comprising:
   establishing, by the wireless device, a second multi-link NAV transmission period at a second time, wherein initiation of the multi-link channel availability assessment procedure for the third wireless link is based on the first multi-link NAV transmission period and the second multi-link NAV transmission period.

3. The method of claim 1, wherein the multi-link channel availability assessment procedure for the second wireless link of the wireless device includes a modified received signal strength measurement based on a measured received signal strength resulting from transmission of other messages on a first channel.

4. The method of claim 3, further comprising:
generating, by the wireless device, an interference measurement matrix that includes measured signal strengths of each transmitting wireless link of the wireless device measured by a non-transmitting link.

5. The method of claim 4, further comprising:
modifying, by the wireless device, an energy detection threshold (EDT) of a wireless link based on the interference measurement matrix.

6. The method of claim 1, further comprising:
transmitting, by the wireless device, a first downlink message on the first wireless link and a second downlink message on the second wireless link simultaneously responsive to completion of the multi-link channel availability assessment procedure.

7. The method of claim 1, further comprising:
transmitting, by the wireless device, a first uplink message on the first wireless link and a second uplink message on the second wireless link simultaneously responsive to completion of the multi-link channel availability assessment procedure.

8. A wireless device for wireless communication, comprising a processor that when configured causes the wireless device to:
identify that a first wireless link of the wireless device and a second wireless link of the wireless device are in a busy state at a first time;
responsive to a detection that the first wireless link is in a transmission state at the first time, adjust a multi-link channel availability assessment procedure for the second wireless link based on the transmission state of the first wireless link and initiating the multi-link channel availability assessment procedure for the second wireless link; and
establish, by the wireless device, a first multi-link network allocation vector (NAV) transmission period at the first time, wherein initiation of the multi-link channel availability assessment procedure for the second wireless link and a third wireless link is based on the first multi-link NAV transmission period.

9. The wireless device of claim 8, wherein the processor is further configured to:
establish a second multi-link NAV transmission period at a second time, wherein initiation of the multi-link channel availability assessment procedure for the third wireless link is based on the first multi-link NAV transmission period and the second multi-link NAV transmission period.

10. The wireless device of claim 8, wherein the multi-link channel availability assessment procedure for the second wireless link of the wireless device includes a modified received signal strength measurement based on a measured received signal strength resulting from transmission of other messages on a first channel.

11. The wireless device of claim 10, wherein the processor is further configured to:
generate an interference measurement matrix that includes measured signal strengths of each transmitting wireless link of the wireless device measured by a non-transmitting link.

12. The wireless device of claim 11, wherein the processor is further configured to:
modify an energy detection threshold (EDT) of a wireless link based on the interference measurement matrix.

13. The wireless device of claim 8, wherein the processor is further configured to:
transmit a first downlink message on the first wireless link and a second downlink message on the second wireless link simultaneously responsive to completion of the multi-link channel availability assessment procedure.

14. The wireless device of claim 8, wherein the processor is further configured to:
transmit a first uplink message on the first wireless link and a second uplink message on the second wireless link simultaneously responsive to completion of the multi-link channel availability assessment procedure.

15. A non-transitory computer readable medium having code stored thereon, the code when executed by a processor, causing the processor to implement a method comprising:
identifying, by a wireless device, that a first wireless link of the wireless device and a second wireless link of the wireless device are in a busy state at a first time;
responsive to detecting that the first wireless link is in a transmission state at the first time, adjusting, by the wireless device, a multi-link channel availability assessment procedure for the second wireless link based on the transmission state of the first wireless link and initiating the multi-link channel availability assessment procedure for the second wireless link; and
establishing, by the wireless device, a first multi-link network allocation vector (NAV) transmission period at the first time, wherein initiation of the multi-link channel availability assessment procedure for the second wireless link and a third wireless link is based on the first multi-link NAV transmission period.

16. The non-transitory computer readable medium of claim 15, wherein the method further comprises:
establishing, by the wireless device, a second multi-link NAV transmission period at a second time, wherein initiation of the multi-link channel availability assessment procedure for the third wireless link is based on the first multi-link NAV transmission period and the second multi-link NAV transmission period.

17. The non-transitory computer readable medium of claim 15, wherein the multi-link channel availability assessment procedure for the second wireless link of the wireless device includes a modified received signal strength measurement based on a measured received signal strength resulting from transmission of other messages on a first channel.

18. The non-transitory computer readable medium of claim 17, wherein the method further comprises:
generating, by the wireless device, an interference measurement matrix that includes measured signal strengths of each transmitting wireless link of the wireless device measured by a non-transmitting link.

19. The non-transitory computer readable medium of claim 18, wherein the method further comprises:
modifying, by the wireless device, an energy detection threshold (EDT) of a wireless link based on the interference measurement matrix.

20. The non-transitory computer readable medium of claim 15, wherein the method further comprises:
 transmitting, by the wireless device, a first downlink message on the first wireless link and a second downlink message on the second wireless link simultaneously responsive to completion of the multi-link channel availability assessment procedure.

\* \* \* \* \*